US012199900B2

(12) United States Patent
Sakhnini et al.

(10) Patent No.: US 12,199,900 B2
(45) Date of Patent: Jan. 14, 2025

(54) TECHNIQUES FOR IDENTIFYING CONTROL CHANNEL CANDIDATES BASED ON REFERENCE SIGNAL SEQUENCES

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 17/498,595

(22) Filed: Oct. 11, 2021

(65) Prior Publication Data
US 2023/0111781 A1 Apr. 13, 2023

(51) Int. Cl.
H04L 5/00 (2006.01)
(52) U.S. Cl.
CPC .................. H04L 5/0048 (2013.01)
(58) Field of Classification Search
CPC .............. H04L 5/0048; H04L 27/26
See application file for complete search history.

(56) References Cited

U.S. PATENT DOCUMENTS

| 2016/0227525 | A1* | 8/2016 | Werner | H04L 1/0072 |
|---|---|---|---|---|
| 2017/0086188 | A1* | 3/2017 | Li | H04W 72/21 |
| 2018/0359772 | A1* | 12/2018 | Park | H04W 72/1268 |
| 2019/0158259 | A1* | 5/2019 | Park | H04W 72/0446 |
| 2019/0268208 | A1* | 8/2019 | Seo | H04L 27/2657 |
| 2020/0367242 | A1* | 11/2020 | Moon | H04L 5/0048 |
| 2020/0412515 | A1 | 12/2020 | Xu et al. | |

(Continued)

FOREIGN PATENT DOCUMENTS

| WO | WO-2013085451 A1 * | 6/2013 | ......... H04L 25/0226 |
|---|---|---|---|
| WO | WO-2014113971 A1 * | 7/2014 | ........... H04L 5/0023 |
| WO | WO-2021197192 A1 * | 10/2021 | |

OTHER PUBLICATIONS

ASUSTEK: "Correction on Physical Downlink Control Channel", 3GPP TSG RAN WG1 #96bis, R1-1905116, 3rd Generation Partnership Project, Mobile Competence Centre, 650, Route Des Lucioles, F-06921 Sophia-Antipolis Cedex, vol. RAN WG1, No. Xian, China, Apr. 8, 2019-Apr. 12, 2019, Apr. 7, 2019, XP051700201, 11 Pages.

(Continued)

Primary Examiner — Joseph E Avellino
Assistant Examiner — Maryam Emadi
(74) Attorney, Agent, or Firm — Dalei Dong; Holland & Hart LLP

(57) ABSTRACT

Methods, systems, and devices for wireless communications are described that provide for reference signal sequence detection by a user equipment (UE). The reference signal sequence may indicate one or more control channel candidates that are to be monitored for control information transmissions to the UE. A base station may transmit control information with a set of parameters for two or more reference signal sequences that are each associated different subsets of decoding candidates within a search space occasion. The UE may monitor the search space occasion and detect a first reference signal sequence and may identify a first subset of the two or more subsets of control channel candidate locations for a blind decoding procedure based on the detection of the first reference signal sequence.

28 Claims, 20 Drawing Sheets

(56) References Cited

U.S. PATENT DOCUMENTS

2021/0289486 A1\* 9/2021 Chiu .................. H04L 27/2675

OTHER PUBLICATIONS

International Search Report and Written Opinion—PCT/US2022/076280—ISA/EPO—Dec. 19, 2022.
Takeda K., et al., "Understanding the Heart of the 5G Air Interface: An Overview of Physical Downlink Control Channel for 5G New Radio", IEEE Communications Standards Magazine, IEEE, vol. 4, No. 3, Sep. 23, 2020, XP011810635, pp. 22-29.

\* cited by examiner

TECHNIQUES FOR IDENTIFYING CONTROL CHANNEL CANDIDATES BASED ON REFERENCE SIGNAL SEQUENCES

FIELD OF TECHNOLOGY

The following relates to wireless communications, including techniques for identifying control channel candidates based on reference signal sequences.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support downlink control channel monitoring for candidate locations in which a UE may attempt to decode control information by performing a process known as a blind decode (BD), during which a set of search space candidates are decoded to determine if control information relevant to the UE is present. BD procedures may consume UE power and resources, and techniques for efficient monitoring for control information may help reduce UE power consumption and enhance network efficiency.

SUMMARY

The described techniques relate to improved methods, systems, devices, and apparatuses that support techniques for identifying control channel candidates based on reference signal sequences. In accordance with various aspects, the described techniques provide for reference signal sequence detection by a user equipment (UE) that may indicate one or more control channel candidates that are to be monitored for control information transmissions to the UE. In some cases, a base station may transmit control information that indicates a set of parameters for two or more reference signal sequences associated with a search space occasion for a control channel communication. Each reference signal sequence may be associated with a different subset of two or more subsets of control channel candidate locations within the search space occasion. The UE may monitor the search space occasion and detect a first reference signal sequence of the two or more reference signal sequences in a reference signal transmission of the search space occasion. Based on the detection of the first reference signal sequence, the UE may identify a first subset of the two or more subsets of control channel candidate locations for a blind decoding procedure associated with the control channel communication, and perform blind decoding on the first subset of control channel candidate locations to determine if the control channel communication is present.

A method for wireless communication at a user equipment (UE) is described. The method may include receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations, detecting a first reference signal sequence of the two or more reference signal sequences in a reference signal transmission in the search space occasion, and identifying, based on the detecting the first reference signal sequence, a first subset of the two or more subsets of control channel candidate locations for a blind decoding procedure associated with the control channel communication.

An apparatus for wireless communication at a UE is described. The apparatus may include a processor, memory coupled with the processor, and instructions stored in the memory. The instructions may be executable by the processor to cause the apparatus to receive, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations, detect a first reference signal sequence of the two or more reference signal sequences in a reference signal transmission in the search space occasion, and identify, based on the detecting the first reference signal sequence, a first subset of the two or more subsets of control channel candidate locations for a blind decoding procedure associated with the control channel communication.

Another apparatus for wireless communication at a UE is described. The apparatus may include means for receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations, means for detecting a first reference signal sequence of the two or more reference signal sequences in a reference signal transmission in the search space occasion, and means for identifying, based on the detecting the first reference signal sequence, a first subset of the two or more subsets of control channel candidate locations for a blind decoding procedure associated with the control channel communication.

A non-transitory computer-readable medium storing code for wireless communication at a UE is described. The code may include instructions executable by a processor to receive, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations, detect a first reference signal sequence of the two or more reference signal sequences in a reference signal transmission in the search space occasion, and identify, based on the detecting the first reference signal sequence, a first subset of the two or more subsets of control channel candidate locations for a blind decoding procedure associated with the control channel communication.

In some examples of the method, apparatuses, and non-transitory computer-readable medium described herein, the first reference signal sequence indicates that the control channel communication is present in the first subset of the control channel candidate locations, and a second reference signal sequence of the two or more reference signal sequences indicates an absence of the control channel communication in the first subset of control channel candidate locations. In some examples of the method, apparatuses, and non-transitory computer-readable medium described herein, the first subset of the two or more subsets of control channel candidate locations include fewer than all available control channel candidate locations in the search space occasion, and a second subset of the two or more subsets of control channel candidate locations includes one or more control channel candidate locations that are different than the first subset of control channel candidate locations.

Some examples of the method, apparatuses, and non-transitory computer-readable medium described herein may further include operations, features, means, or instructions for performing the blind decoding procedure on a first control channel candidate location of the first subset of the two or more subsets of control channel candidate locations and performing the blind decoding procedure on at least a second control channel candidate location of the first subset of the two or more subsets of control channel candidate locations based on an unsuccessful blind decoding on the first control channel candidate location.

Some examples of the method, apparatuses, and non-transitory computer-readable medium described herein may further include operations, features, means, or instructions for determining the two or more reference signal sequences based on the set of parameters provided with the control information, where the set of parameters include one or more time domain parameters associated with the search space occasion, one or more network identification parameters associated with the search space occasion, and one or more sequence shifting or scrambling patterns that provide two or more alternative sequences that correspond to the two or more reference signal sequences.

In some examples of the method, apparatuses, and non-transitory computer-readable medium described herein, the detecting may include operations, features, means, or instructions for monitoring for each of the two or more reference signal sequences in a set of reference signal resources of the search space occasion and detecting that the first reference signal sequence is present in a reference signal that is transmitted in the set of reference signal resources, and where the first subset of the two or more subsets of control channel candidate locations is associated with the first reference signal sequence and a second subset the two or more subsets of control channel candidate locations is associated with a second reference signal sequence of the two or more reference signal sequences.

In some examples of the method, apparatuses, and non-transitory computer-readable medium described herein, the reference signal transmission in the search space occasion is a wideband demodulation reference signal (DMRS) that spans all control channel candidate locations in the search space occasion, and is for use by a set of multiple UEs that monitor for control channel communications in the search space occasion. In some examples of the method, apparatuses, and non-transitory computer-readable medium described herein, the reference signal transmission in the search space occasion is a narrowband DMRS that spans only the first subset of the two or more subsets of control channel candidate locations in the search space occasion, and is for use by one or more UEs that are configured to monitor for the first reference signal sequence. In some examples of the method, apparatuses, and non-transitory computer-readable medium described herein, the reference signal transmission is transmitted in the first subset of control channel candidate locations without a corresponding control channel communication in the first subset of control channel candidate locations.

In some examples of the method, apparatuses, and non-transitory computer-readable medium described herein, the two or more subsets of control channel candidate locations span two or more symbols of the search space occasion, and each symbol of the two or more symbols has an associated reference signal transmission, and where the first reference signal sequence is used for at least one of the two or more symbols. Some examples of the method, apparatuses, and non-transitory computer-readable medium described herein may further include operations, features, means, or instructions for transmitting, to the base station, a capability indication that provides a capability of the UE to detect alternative reference signal sequences in one or more search space occasions. In some examples of the method, apparatuses, and non-transitory computer-readable medium described herein, the capability indication includes one or more of a capability to detect alternative DMRS sequences, a capability to receive wideband or narrowband DMRSs, a number of different DMRS sequences that can be concurrently monitored by the UE, a timing adjustment associated with DMRS sequence detection, or any combinations thereof.

Some examples of the method, apparatuses, and non-transitory computer-readable medium described herein may further include operations, features, means, or instructions for determining one or more timing adjustments for decoding the control channel communication or an associated shared channel communication based on the set of parameters for the two or more reference signal sequences and decoding one or more of the control channel communication or the associated shared channel communication based on the one or more timing adjustments.

A method for wireless communication at a base station is described. The method may include transmitting, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations, selecting a first control channel candidate location for the control channel communication, determining a first reference signal sequence of the two or more reference signal sequences in the search space occasion based on the first control channel candidate location being in a first subset of the two or more subsets of control channel candidate locations, and transmitting a reference signal using the first reference signal sequence and the control channel communication in the first control channel candidate location.

An apparatus for wireless communication at a base station is described. The apparatus may include a processor, memory coupled with the processor, and instructions stored in the memory. The instructions may be executable by the processor to cause the apparatus to transmit, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations, select a first control channel candidate location for the control channel communication, determine a first reference signal sequence of the two or more reference signal sequences in the search space occasion based on the first control channel candidate location being in a first subset of the two or more subsets of control channel candidate locations, and transmit a reference signal using the first reference signal sequence and the control channel communication in the first control channel candidate location.

Another apparatus for wireless communication at a base station is described. The apparatus may include means for transmitting, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations, means for selecting a first control channel candidate location for the control channel communication, means for determining a first reference signal sequence of the two or more reference signal sequences in the search space occasion based on the first control channel candidate location being in a first subset of the two or more subsets of control channel candidate locations, and means for transmitting a reference signal using the first reference signal sequence and the control channel communication in the first control channel candidate location.

A non-transitory computer-readable medium storing code for wireless communication at a base station is described. The code may include instructions executable by a processor to transmit, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations, select a first control channel candidate location for the control channel communication, determine a first reference signal sequence of the two or more reference signal sequences in the search space occasion based on the first control channel candidate location being in a first subset of the two or more subsets of control channel candidate locations, and transmit a reference signal using the first reference signal sequence and the control channel communication in the first control channel candidate location.

In some examples of the method, apparatuses, and non-transitory computer-readable medium described herein, the first reference signal sequence indicates that the control channel communication is present in the first subset of control channel candidate locations, and a second reference signal sequence of the two or more reference signal sequences indicates an absence of the control channel communication in the first subset of control channel candidate locations. In some examples of the method, apparatuses, and non-transitory computer-readable medium described herein, the first subset of the two or more subsets of control channel candidate locations include fewer than all available control channel candidate locations in the search space occasion, and a second subset of the two or more subsets of control channel candidate locations includes one or more control channel candidate locations that are different than the first subset of control channel candidate locations.

Some examples of the method, apparatuses, and non-transitory computer-readable medium described herein may further include operations, features, means, or instructions for determining the two or more reference signal sequences based on the set of parameters provided with the control information, where the set of parameters include one or more time domain parameters associated with the search space occasion, one or more network identification parameters associated with the search space occasion, and one or more sequence shifting or scrambling patterns that provide two or more alternative sequences that correspond to the two or more reference signal sequences.

In some examples of the method, apparatuses, and non-transitory computer-readable medium described herein, the reference signal in the search space occasion is a wideband DMRS that spans all control channel candidate locations in the search space occasion, and is for use by a set of multiple UEs that monitor for control channel communications in the search space occasion. In some examples of the method, apparatuses, and non-transitory computer-readable medium described herein, the reference signal in the search space occasion is a narrowband DMRS that spans only the first subset of the two or more subsets of control channel candidate locations in the search space occasion, and is for use by one or more UEs that are configured to monitor for the first reference signal sequence. In some examples of the method, apparatuses, and non-transitory computer-readable medium described herein, the two or more subsets of control channel candidate locations span two or more symbols of the search space occasion, and each symbol of the two or more symbols has an associated reference signal transmission, and where the first reference signal sequence is used for at least one of the two or more symbols.

Some examples of the method, apparatuses, and non-transitory computer-readable medium described herein may further include operations, features, means, or instructions for receiving, from the UE, a capability indication that provides a capability of the UE to detect alternative reference signal sequences in one or more search space occasions. In some examples of the method, apparatuses, and non-transitory computer-readable medium described herein, the capability indication includes one or more of a capability to detect alternative DMRS sequences, a capability to receive wideband or narrowband DMRSs, a number of different DMRS sequences that can be concurrently monitored by the UE, a timing adjustment associated with DMRS sequence detection, or any combinations thereof. Some examples of the method, apparatuses, and non-transitory computer-readable medium described herein may further include operations, features, means, or instructions for configuring one or more timing adjustments at the UE for decoding the control channel communication or an associated shared channel communication based on the set of parameters for the two or more reference signal sequences.

DETAILED DESCRIPTION

Figure 1:
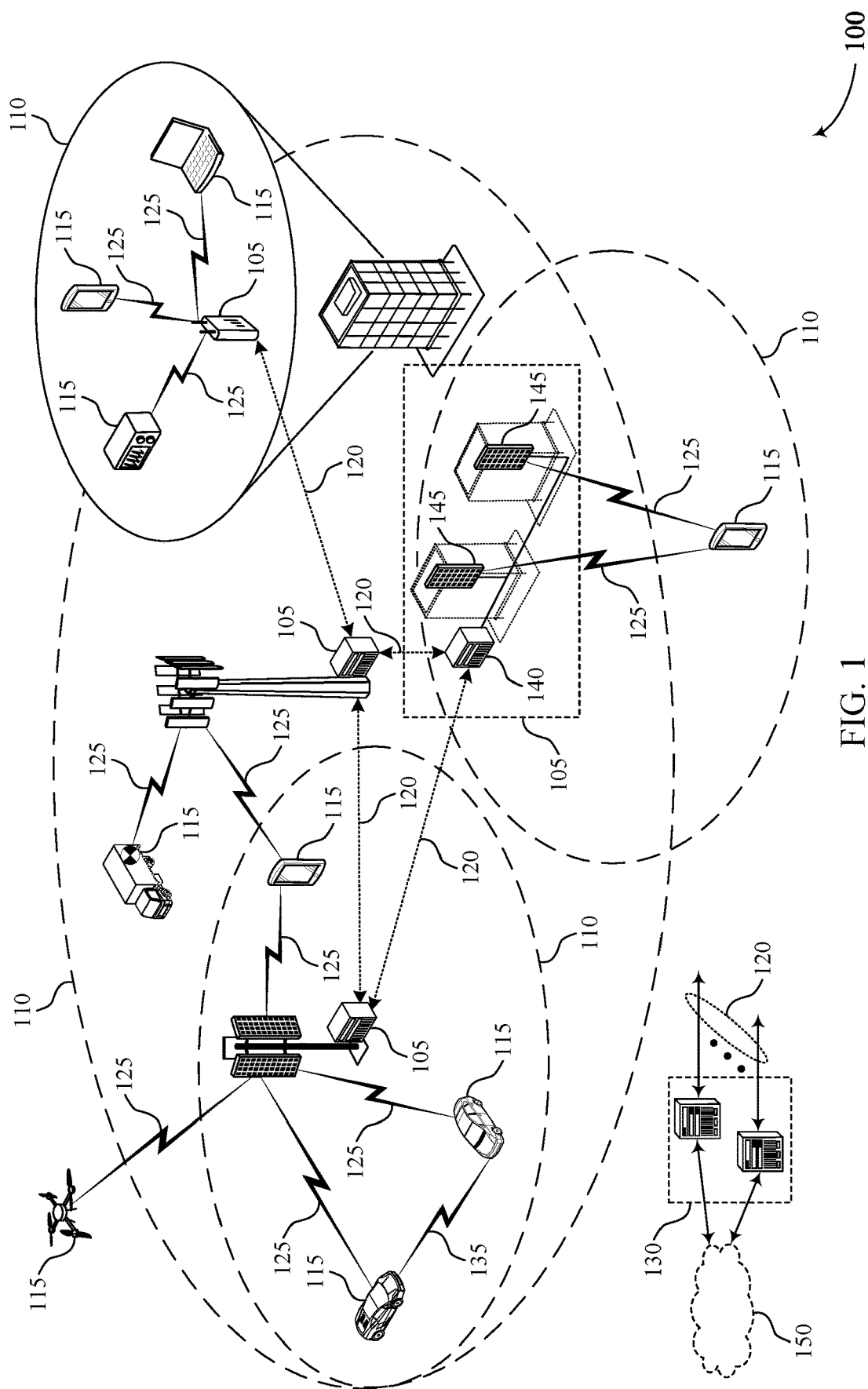
FIG. 1 illustrates an example of a wireless communications system that supports techniques for identifying control channel candidates based on reference signal sequences in accordance with aspects of the present disclosure.

Some wireless communications systems may support control channel monitoring, such as physical downlink control channel (PDCCH) monitoring, in which a user equipment (UE) may attempt to decode control information (e.g., downlink control information (DCI)) by performing a process known as a blind decode (BD), during which search spaces are decoded until the DCI is detected. During a blind decode, the UE may attempt descramble one or more potential DCI messages using its cell-radio network temporary identifier (C-RNTI) and perform a cyclic redundancy check (CRC) to determine whether the attempt was successful. If the CRC does not pass, the UE moves on to the next candidate location and the process continues until the CRC passes or all of the candidate locations have been checked. Such blind decoding can thus consume substantial UE power, particularly in cases where a base station may configure a large number of control channel candidate locations to allow for multiplexing a relatively large number of UEs (e.g., which may provide scheduling flexibility at the base station which may help the base station to maintain quality of service (QoS) targets).

In accordance with various techniques discussed herein, a number of control channel candidate locations that need to be blind decoded by a UE may be reduced, while maintaining base station flexibility to configure control channel candidate locations that maintain multiplexing capability. In some cases, described techniques provide for reference signal sequence detection by a UE, where the reference signal sequence identifies one or more control channel candidates that are to be monitored for control information transmissions. In some cases, a base station may transmit control information that indicates a set of parameters for multiple reference signal sequences associated with a search space occasion for a control channel communication (e.g., demodulation reference signal (DMRS) sequences). Each reference signal sequence may be associated with different subsets of control channel candidate locations within the search space occasion. The UE may monitor the search space occasion and detect a first reference signal sequence, and based on the detection of the first reference signal sequence, may identify a first subset of control channel candidate locations for a blind decoding procedure. The UE may perform blind decoding on the first subset of control channel candidate locations to determine if the control channel communication is present.

For example, the base station may configure multiple different DMRS sequences for a DMRS that is transmitted in a search space occasion, where different DMRS sequences may indicate that different subsets of PDCCH candidates are to be monitored within a search space occasion. A particular DMRS sequence may indicate to a UE whether a PDCCH is present or not within a search space occasion, or may indicate a particular subset of PDCCH candidates to be searched. The different DMRS sequences may be based on one or more additional parameters that are added to existing parameters used to generate a DMRS sequence, and a UE may test different DMRS hypotheses and only do a full decode of candidate PDCCH locations based on the indication from which DMRS sequence was used. The DMRS may be a wideband DMRS (e.g., where multiple UEs use the same indicated candidates) or candidate specific DMRS within particular PDCCH candidates, with the DMRS sequence designated for one or more UEs. Additionally, in some cases a DMRS may be transmitted without an actual PDCCH, with the selected DMRS sequence providing one or more bits of information. DMRS sequences may be selected for one or more symbols in the event that a PDCCH spans two or more symbols. In some cases, UEs may transmit capability information to the base station, and DMRS sequence selection may be based on the UE capability. Further, in some cases, adjustments to a timing for decoding of physical downlink shared channel (PDSCH) may be made to allow for the DMRS sequence detection in addition to PDCCH decoding.

Particular aspects of the subject matter described herein may be implemented to realize one or more advantages. The described techniques may support improvements in control channel monitoring. For example, the reduced number of control channel candidates to be monitored may allow for reduced processing resources for a UE identifying which, and how many, candidates to monitor for control information. Accordingly, the UE may identify control channel candidates and perform blind decoding on fewer candidates than would otherwise be blind decoded, thereby reducing complexity and providing improved efficiency and power consumption at the UE. Further, described techniques provide base station flexibility to configure control channel candidate locations that maintain relatively high multiplexing capability. Thus, the supported techniques may include improved UE operations, and, in some examples, may promote efficiencies in communications (e.g., reduced latency, increased reliability) power management, and scheduling flexibility, among other benefits.

Aspects of the disclosure are initially described in the context of wireless communications systems. Aspects of the disclosure are then described in the context of resource diagrams and process flows. Aspects of the disclosure are further illustrated by and described with reference to apparatus diagrams, system diagrams, and flowcharts that relate to techniques for identifying control channel candidates based on reference signal sequences.

FIG. 1 illustrates an example of a wireless communications system 100 that supports techniques for identifying control channel candidates based on reference signal sequences in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a UE 115 may monitor for control channel transmissions from a base station 105 using blind decoding techniques. In order to reduce a number of control channel candidates that are to be blind decoded, the UE 115 may detect a reference signal sequence of a reference signal transmitted in a monitoring occasion. The reference signal sequence may indicate one or more control channel candidates that are to be monitored for control information transmissions to the UE 115. In some cases, a base station 105 may transmit control information that indicates a set of parameters for multiple reference signal sequences associated with a search space occasion for a control channel communication (e.g., DMRS sequences). Each reference signal sequence may be associated with different subsets of control channel candidate locations within the search space occasion. The UE 115 may monitor the search space occasion and detect a first reference signal sequence, and based on the detection of the first reference signal sequence, may identify a first subset of control channel candidate locations for a blind decoding procedure. The UE 115 may perform blind decoding on the first subset of control channel candidate locations to determine if the control channel communication is present.

Figure 2:
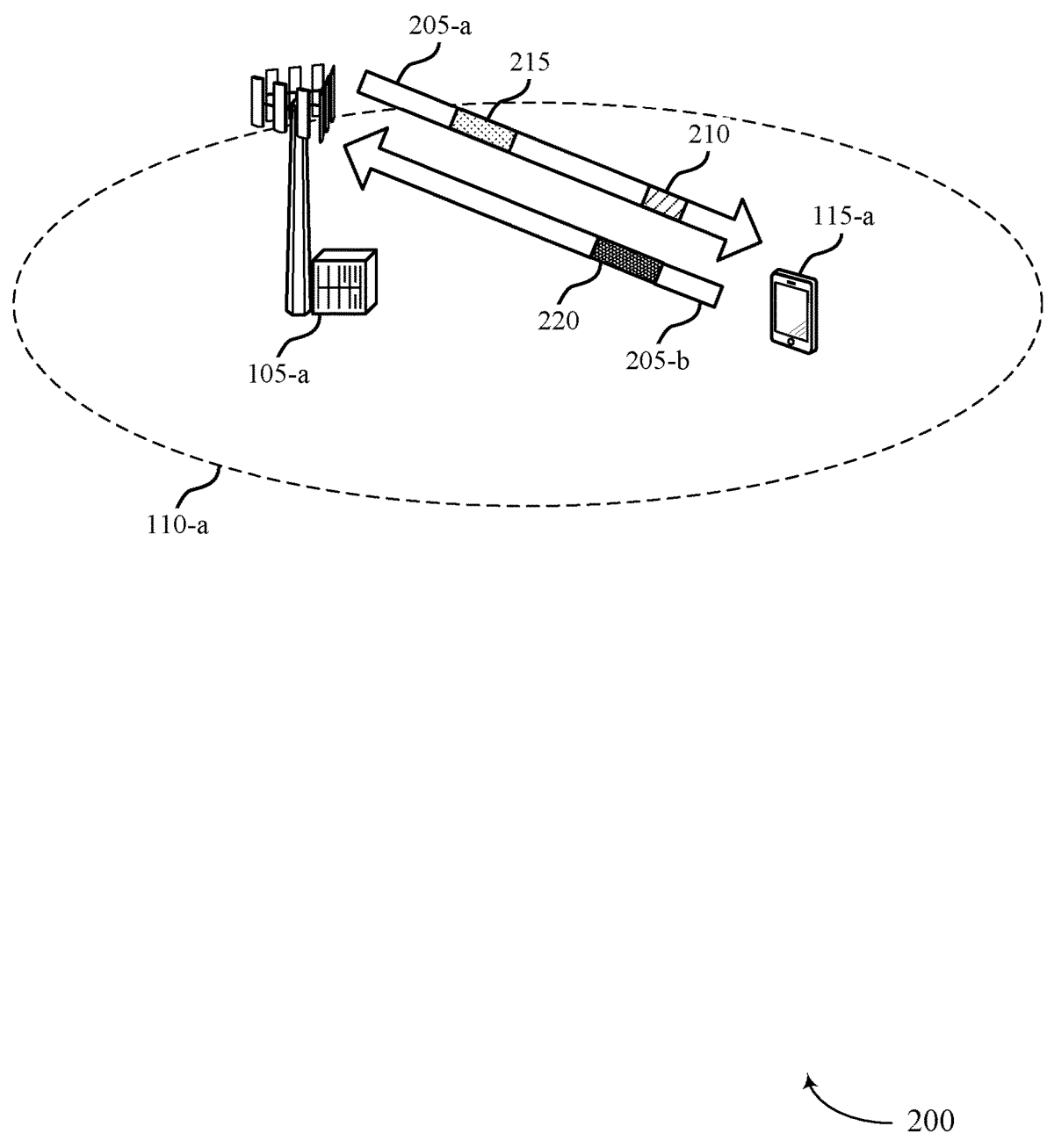
FIG. 2 illustrates an example of a portion of a wireless communications system that supports techniques for identifying control channel candidates based on reference signal sequences in accordance with aspects of the present disclosure.

FIG. 2 illustrates an example of a wireless communications system 200 that supports techniques for identifying control channel candidates based on reference signal sequences in accordance with aspects of the present disclosure. In some examples, wireless communications system 200 may implement aspects of wireless communications system 100. The wireless communications system 200 may illustrate communications between a base station 105-*a* and a UE 115-*a* which may be examples of corresponding devices as described with reference to FIG. 1. In some cases, the base station 105-*a* may serve a geographic coverage area 110-*a*, providing service to one or more other devices such as UE 115-*a*.

In some examples, the wireless communications system 200 may support the base station 105-*a* transmitting control information 210 to the UE 115-*a* via a downlink carrier 205-*a*, and the UE 115-*a* transmitting uplink communications 220 to the base station 105-*a* via uplink carrier 205-*b*. In some cases, the control information 210 may be transmitted via RRC signaling, any may indicate a set of parameters for two or more reference signal sequences associated with a search space occasion for a control channel communication 215 from the base station 105-*a*. In some cases, each reference signal sequence is associated with a different subset of two or more subsets of control channel candidate locations within the search space occasion. In some cases, the multiple reference signal sequences may be enabled based on a UE 115-*a* capability, which may be transmitted to the base station 105-*a* in uplink communications 220 (e.g., in a capability message that is transmitted using RRC signaling, uplink control channel signaling, or in a medium access control (MAC) control element (CE), for example.

In some cases, a PDCCH DMRS sequence can be used to indicate whether a PDCCH transmission is present in the current search space (or control resource set (CORESET)) occasion. In some cases, additionally or alternatively, the PDCCH DMRS sequence may indicate one or more PDCCH candidates used for a transmission. Based on the detected PDCCH DMRS sequence, the UE 115-*a* may only try to blind detect the PDCCH candidates associated with the identified DMRS sequence. In some cases, a parameter may be included as part of the initialization equation used for the PDCCH DMRS sequence generator, where the parameter provides some information related to the PDCCH candidates, some other information, or any combinations thereof. The UE 115-*a* may use multiple hypotheses to detect the PDCCH DMRS sequence. Based on the detected DMRS sequence, the UE 115-*a* may determine the associated parameter(s), and identify information (e.g., PDCCH candidates or some other information) based on a mapping of the associated parameter(s). In some cases, the DMRS used for the information indication can be a wideband DMRS (e.g. DMRS that spans a search space occasion and is monitored by multiple UEs that are configured to use the indicated PDCCH candidates), and that provides for dynamically adapting the number of PDCCH candidates. In other cases, the DMRS of one or more specific PDCCH candidates may be designated to one or more UEs. In such cases, the associated PDCCH candidates may be preconfigured to the UE 115-*a* (e.g., via RRC signaling) so different UEs can have different numbers of candidates. Further, in some cases, the DMRS may be sent with or without an associated PDCCH DCI (e.g., the DMRS sequence itself may provide information to the UE 115-*a*). In some cases, a PDCCH may span more than one symbol, and the DMRS sequence may be indicated using DMRS of all or a subset of the symbols.

As discussed, in some cases the UE 115-*a* may provide a capability indication to the base station 105-*a* that indicate a capability for detecting the information from the PDCCH DMRS sequence. In some cases, the capability indication may provide a type of DRMS detection the UE 115-*a* can support (e.g., wideband or PDCCH candidate specific), how many DMRS sequence hypothesis the UE 115-*a* can perform, a timing for the UE 115-*a* to detect DMRS sequences (e.g., which may be based on a number of supported hypotheses, a sub-carrier spacing (SCS), or combinations thereof.

Figure 3:
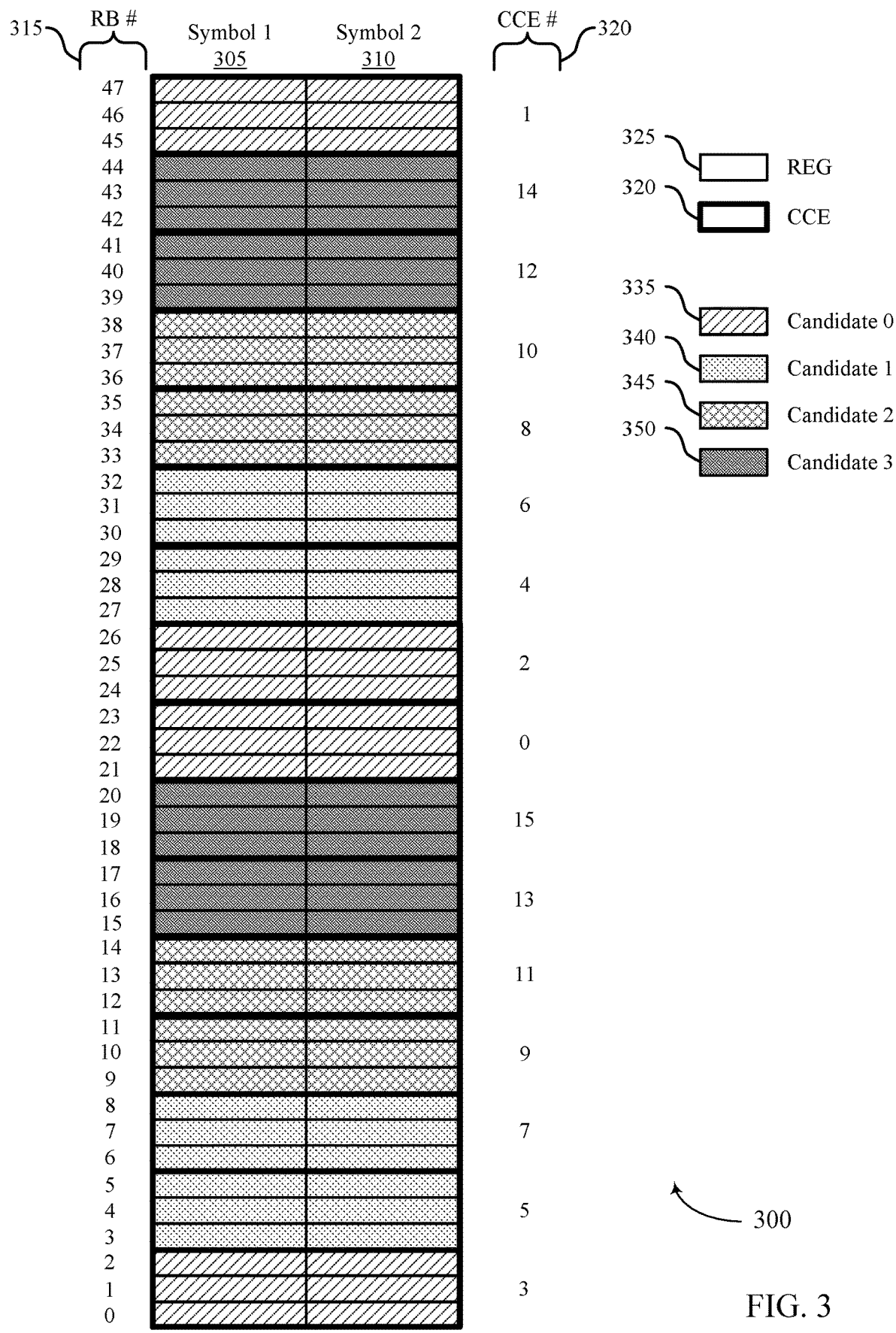
FIG. 3 illustrates an example of PDCCH candidate locations that support techniques for identifying control channel candidates based on reference signal sequences in accordance with aspects of the present disclosure.

FIG. 3 illustrates an example of PDCCH candidate locations 300 that support techniques for identifying control channel candidates based on reference signal sequences in accordance with aspects of the present disclosure. In some examples, the PDCCH candidate locations 300 may implement, or be implemented by, aspects of wireless communications system 100 or 200. For example, resources of a first symbol 305 and a second symbol 310 may be allocated for control channel (e.g., a PDCCH) monitored by receiving devices (e.g., a UE). In particular, the base station may transmit the control information in one or more PDCCH candidates (e.g., one or more of candidate-0 335, candidate-1 340, candidate-2 345, candidate-3 350) within one or more respective search space sets. In some cases, PDCCH candidates, search space sets, or the like may be linked with one another, may overlap with one another, or may otherwise correspond to one another.

In some cases, up to ten search spaces can be configured per UE. In the example, of FIG. 3, 48 RBs 315 may be configured that span the first symbol 305 and second symbol 310. In this example an AL may be set to four, with four PDCCH candidates that are interleaved, to provide PDCCH candidate-0 335 that spans four control channel elements (CCEs) 320 (i.e., CCEs 0 through 3), PDCCH candidate-1 340 (in CCEs 4 through 7), PDCCH candidate-2 (in CCEs 8 through 11), and PDCCH candidate-3 (in CCEs 12 through 15). Each CCE 320 in this example includes six resource element groups (REGs) that span the first symbol 305 and second symbol 310. As discussed herein, to allow for UE multiplexing on the same search space and CORESET, a UE may need to search, by blind decoding, for multiple PDCCH candidates. The number of PDCCH candidates that the UE needs to search may be configured in an RRC configuration message of the search space, where a larger number of PDCCH candidate may result in the UE consuming more power, and also allow for enhanced UE multiplexing and scheduling flexibility at the base station. PDCCH candidates can be reduced by configuring the search space to have a relatively small number of PDCCH candidates, which may result in the UE consuming less power but also lead to reduced UE multiplexing ability and reduced base station scheduling flexibility. Techniques as discussed herein provide for both reduced UE power consumption and enhanced base station operation through the ability to multiplex a relatively large number of UEs if needed.

In some cases, multiple DMRS sequences for PDCCH may be defined per CORESET. The DMRS sequences may be, for example, confined to PDCCH candidates or wideband across all PDCCH candidates in the CORESET. In some cases, the PDCCH DMRS sequence is a pseudo-random sequence initialized with the OFDM symbol number within the slot, the slot number within a frame, an identification value (e.g., an $N_{ID}$ value signaled to the UE or $N_{ID}^{cell}$ if not signaled), and one or more other parameters that are mapped to one or more pieces of information. For example, the one or more other parameters may simply be a single bit with a value of zero corresponding to a first subset of PDCCH candidates and a value of one corresponding to a second subset of PDCCH candidates. Thus, in this example, two potential DMRS sequences may be detected for a particular OFDM symbol, which may indicate a subset of PDCCH candidates that may contain DCI. The receiving UE may then blind decode the PDCCH candidates of the subset of PDCCH candidates rather than all of the PDCCH candidates of the search space occasion. In other cases, additional DMRS sequences (e.g., three or more DMRS sequences) may be available, which may provide an indication of more than two subsets of PDCCH candidates may include DCI, may provide one or more other information bits (e.g., an indication if a different DCI format is used), or any combinations thereof. In some cases, the base station may provide control or configuration information to a UE that identifies the one or more additional parameters that are used to determine a DMRS sequence, and a mapping between different parameter values and corresponding information (e.g., a mapping of a subset of PDCCH candidates to a DMRS sequence). In some cases, the UE may first identify a DMRS sequence that is present in a search space occasion, and then initiate the blind decoding procedure on associated PDCCH candidates.

Figure 4:
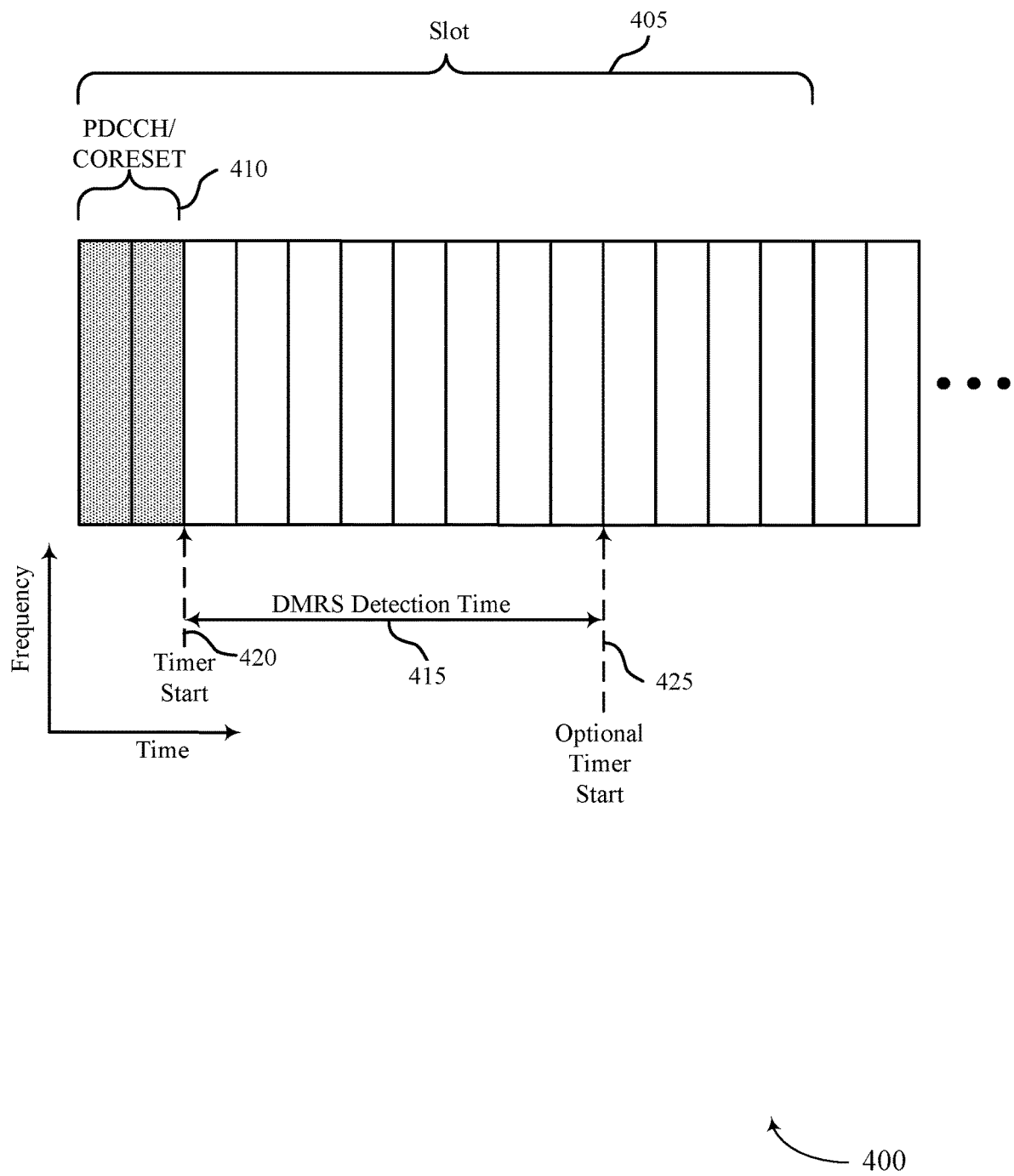
FIG. 4 illustrates an example of a decoding timeline that supports techniques for identifying control channel candidates based on reference signal sequences in accordance with aspects of the present disclosure.

FIG. 4 illustrates an example of a decoding timeline 400 that supports techniques for identifying control channel candidates based on reference signal sequences in accordance with aspects of the present disclosure. In some examples, the decoding timeline 400 may implement, or be implemented by, aspects of wireless communications system 100 or 200. In this example, a slot 405 may include a PDCCH/CORESET 410 monitoring occasion in the first two symbols. In some cases, a DMRS transmitted in the PDCCH/CORESET 410 monitoring occasion may have a DMRS sequence that provides information to a receiving UE (e.g., an indication of a subset of PDCCH candidates that can include DCI).

In this example, priori to performing blind decodes on one or more PDCCH candidates, the UE will need some time to detect the information from the DMRS sequence. During this time, the UE may to buffer time domain samples for PDCCH and PDSCH until the DMRS sequence detection is complete. In the example of FIG. 4, the UE may buffer samples during DMRS detection time 415, for decoding once the DMRS sequence has been detected. In some cases, the DMRS detection time 415 may have a duration that is based on a number of factors, such as UE capability, a number of potential DMRS sequences to be monitored, a bandwidth that is monitored, or any combinations thereof. In some cases, in order to accommodate for the DMRS sequence detection, some timing delays may be added to one or more timers that start from the DCI transmission (e.g., a DCI-to-PDSCH timing (k0), a time domain resource allocation (TDRA), etc.). In some cases, one or more such timers may start from an end of the symbols that may transmit DCI, as indicated at first time 420, and additional time may be added to the one or more timers. In other cases, the one or more timers may start from the end of a preconfigured additional delay, at second time 425, where the preconfigured additional delay may depends on the UE capability of detection the DMRS sequences. In some cases, selecting between timer start at the first time 420 or at the second time 425 can be indicated to the UE (e.g., via RRC, DCI, MAC-CE, or any combinations thereof), along with a duration of a time delay or any time that is to be added to the one or more timers.

Figure 5:
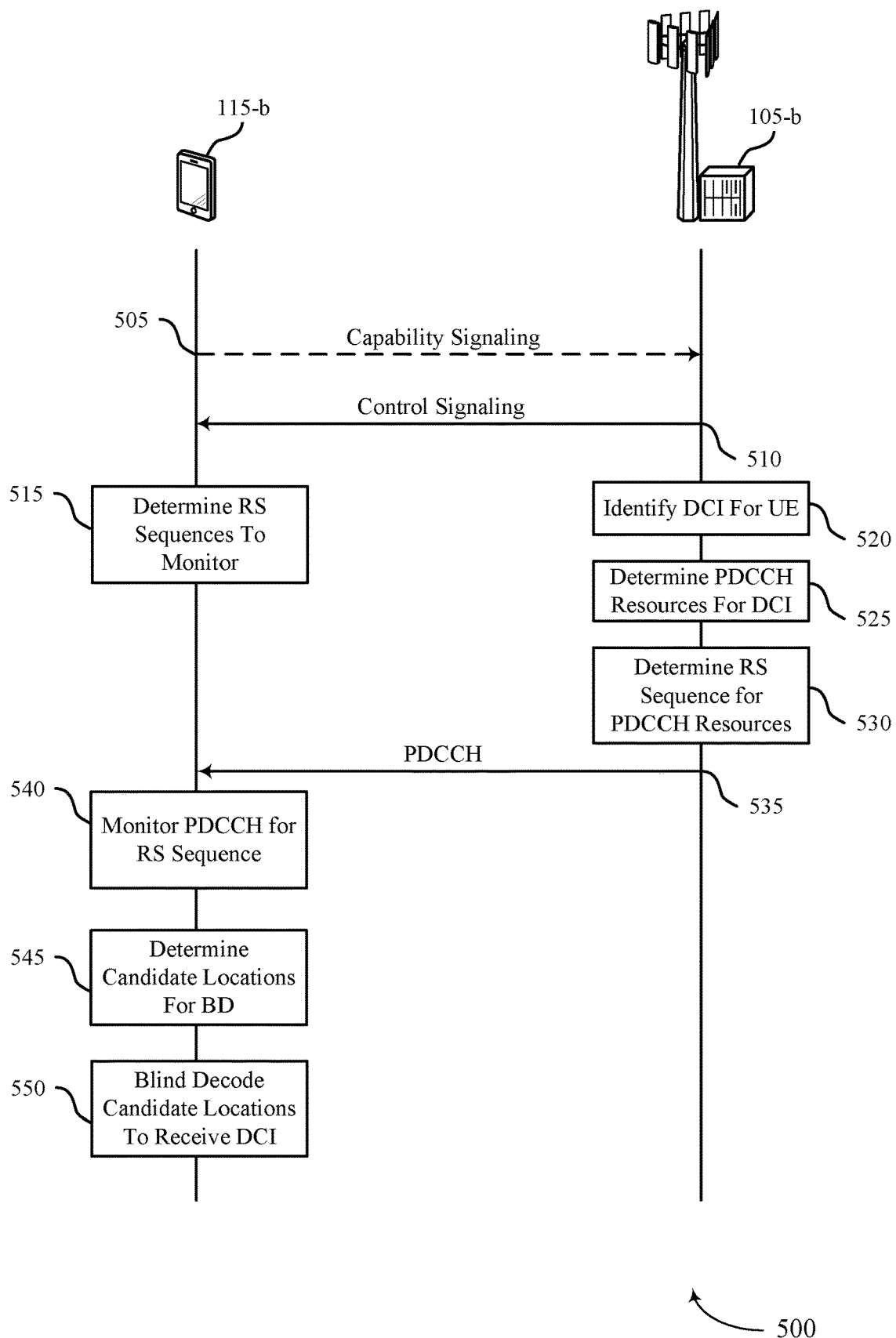
FIG. 5 illustrates an example of a process flow that supports techniques for identifying control channel candidates based on reference signal sequences in accordance with aspects of the present disclosure.

FIG. 5 illustrates an example of a process flow 500 that supports techniques for identifying control channel candidates based on reference signal sequences in accordance with aspects of the present disclosure. In some examples, the process flow 500 may implement, or be implemented by, aspects of wireless communications system 100 or 200, as described with reference to FIGS. 1 and 2, respectively. For example, UE 115-b and base station 105-b, which may be examples of the corresponding devices described with reference to FIGS. 1 and 2, may communicate using one or more communication links, where the base station 105-b may transmit control information to the UE 115-b that indicates parameters for DMRS sequences. The UE 115-b may be operable to monitor PDCCH candidates based on information derived from a detected DMRS sequence, as described with reference to FIGS. 1-3. Alternative aspects of the following may be implemented, where some steps are performed in a different order than described or are not performed at all. In some implementations, steps may include additional features not mentioned below, or further steps may be added.

Optionally, at 505, the UE 115-b may transmit capability signaling to the base station 105-b. In some examples, the capability signaling may include at least an indication of a capability to detect different DMRS sequences in a search space occasion. In some cases, the capability signaling may include a number of different DMRS sequences that can be monitored, a timing associated with DMRS monitoring and detection, or any combinations thereof. In some examples, the capability signaling may include the indication of a number of DMRS sequences that can be monitored per SCS configuration, per PDCCH monitoring configuration (e.g., that may configure various PDCCH candidate monitoring scenarios), per slot, per span, or any other time period, or a combination thereof. Additionally or alternatively, the capability signaling may indicate that the UE 115-b supports PDCCH repetition that may be indicted by a DMRS sequence. In some cases, the capability signaling may be provided in RRC signaling, in control information signaling (e.g., UCI), in a MAC-CE, or any combinations thereof.

At 510, the base station 105-b may transmit control signaling to the UE 115-b. Within the control signaling, the base station 105-b may indicate one or more PDCCH monitoring configurations, and one or more parameters for determining two or more DMRS sequences that may be transmitted in a search space occasion. In some cases, the PDCCH monitoring configurations may indicate one or more parameters for the UE 115-b to use when monitoring the PDCCH, such as a transmission periodicity, slot offsets, monitoring symbols, or any other parameter associated with monitoring the PDCCH, and one or more parameters for use in determining DMRS (or other reference signal) sequences. Further, the control signaling may indicate a mapping of different parameter values for determining a DMRS sequence with information, such as a particular subset of PDCCH candidates may include a DCI.

At 515, the UE 115-b may determine two or more reference signal sequences that are to be monitored in a search space occasion. In some cases, the two or more reference signal sequences may be determined based at least in part on the OFDM symbol number within a slot that is monitored, the slot number within a frame, an identification value (e.g., an $N_{ID}$ value signaled to the UE or $N_{ID}^{cell}$ if not signaled), and one or more other parameters that are mapped to one or more pieces of information (e.g., a single bit with a value of zero corresponding to a first subset of PDCCH candidates and a value of one corresponding to a second subset of PDCCH candidates).

At 520, the base station 105-b may identify DCI for the UE 115-a. In some cases, the DCI may include a resource grant for PDSCH communications to the UE 115-b, or uplink communications from the UE 115-b. At 535, the base station 105-b may determine PDCCH resources for the DCI. In some cases, the PDCCH resources may be selected from a set of available PDCCH resources of a configured set of PDCCH candidates. The base station 105-a, in some cases, may multiplex communications with multiple UEs and flexibility in PDCCH transmission to the different UEs may be provided by allowing the base station to select the PDCCH resources from a number of different available resources. In some cases, the base station 105-b may select the PDCCH resources from one of two or more subsets of PDCCH candidates. At 530, the base station 105-*b* may determine a reference signal sequence from the PDCCH resource. The reference signal may be determined in accordance with techniques as discussed herein, based on a parameter that is associated with the selected subset of PDCCH candidates. At 535, the base station 105-*b* may transmit the PDCCH to the UE 115-*b*, which includes the reference signal that uses the determined reference signal sequence.

At 540, the UE 115-*b* may monitor for the reference signal sequence. In some cases, the UE 115-*b* may test two or more reference signal sequence hypotheses against signals received in reference signal resources to determine which of two or more reference signal sequences are used for the PDCCH transmission. At 545, the UE may determine a subset of PDCCH candidate locations for blind decoding based on the detected reference signal sequence. As discussed herein, the subset of PDCCH candidate locations may be less than a total number of PDCCH candidate locations configured in a search space occasion, which may allow the UE 115-*b* to perform blind decoding on fewer PDCCH candidates, which may reduce power consumption and usage of processing resources at the UE 115-*b*. At 550, the UE 115-*b* may blind decode the identified subset of PDCCH candidates to receive a DCI transmission from the base station 105-*b*.

Figure 6:
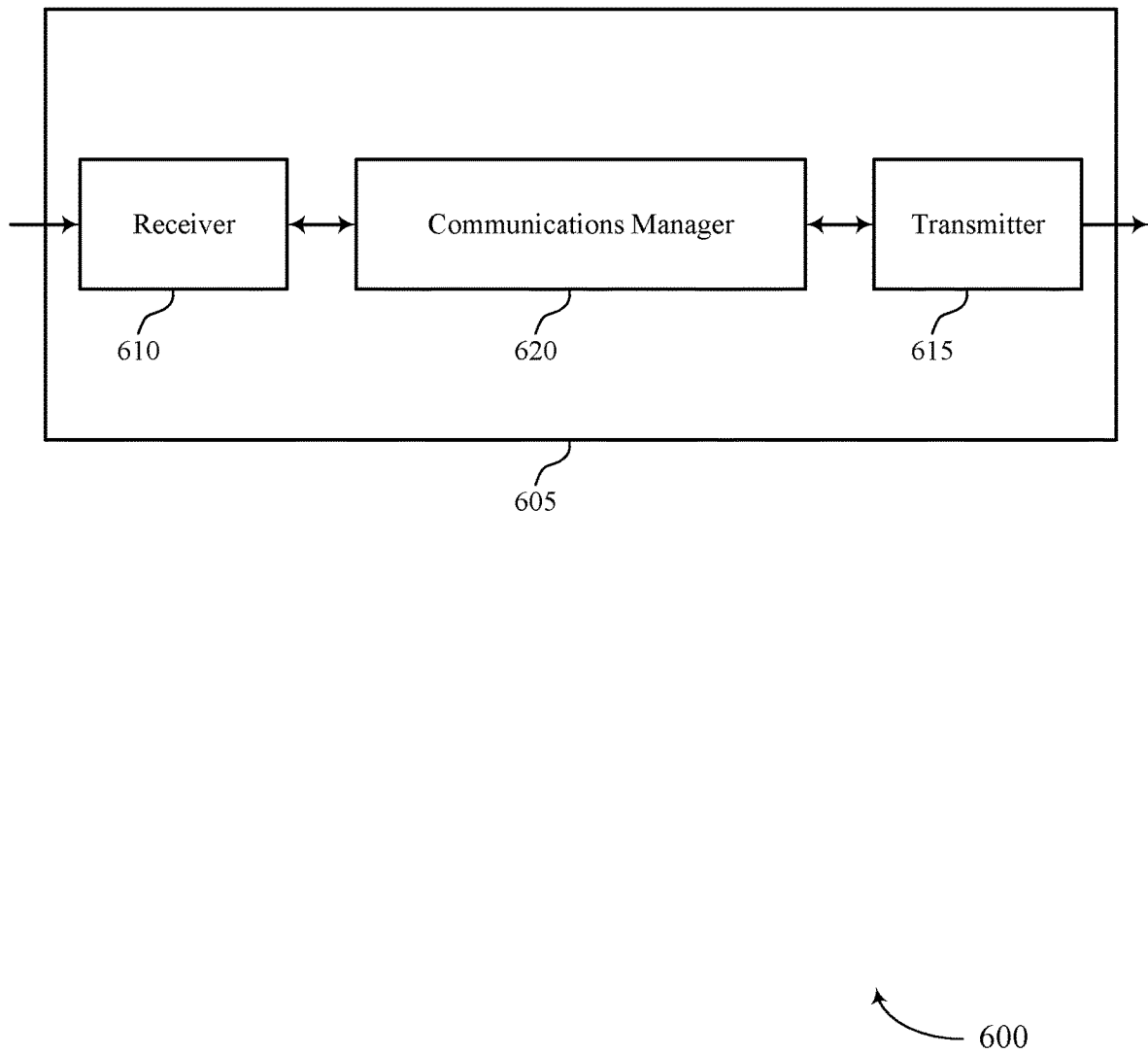
FIGS. 6 and 7 show block diagrams of devices that support techniques for identifying control channel candidates based on reference signal sequences in accordance with aspects of the present disclosure.

FIG. 6 shows a block diagram 600 of a device 605 that supports techniques for identifying control channel candidates based on reference signal sequences in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for identifying control channel candidates based on reference signal sequences). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for identifying control channel candidates based on reference signal sequences). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for identifying control channel candidates based on reference signal sequences as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations. The communications manager 620 may be configured as or otherwise support a means for detecting a first reference signal sequence of the two or more reference signal sequences in a reference signal transmission in the search space occasion. The communications manager 620 may be configured as or otherwise support a means for identifying, based on the detecting the first reference signal sequence, a first subset of the two or more subsets of control channel candidate locations for a blind decoding procedure associated with the control channel communication.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for identifying control channel decoding candidates based on reference signal sequences, where the identified candidates for blind decoding are less than a total number of available blind decoding candidates. Such techniques may reduce an amount of blind decodes performed by a receiving device, increase the efficiency of communication resources, reduce system latency, and save power at such devices.

Figure 7:
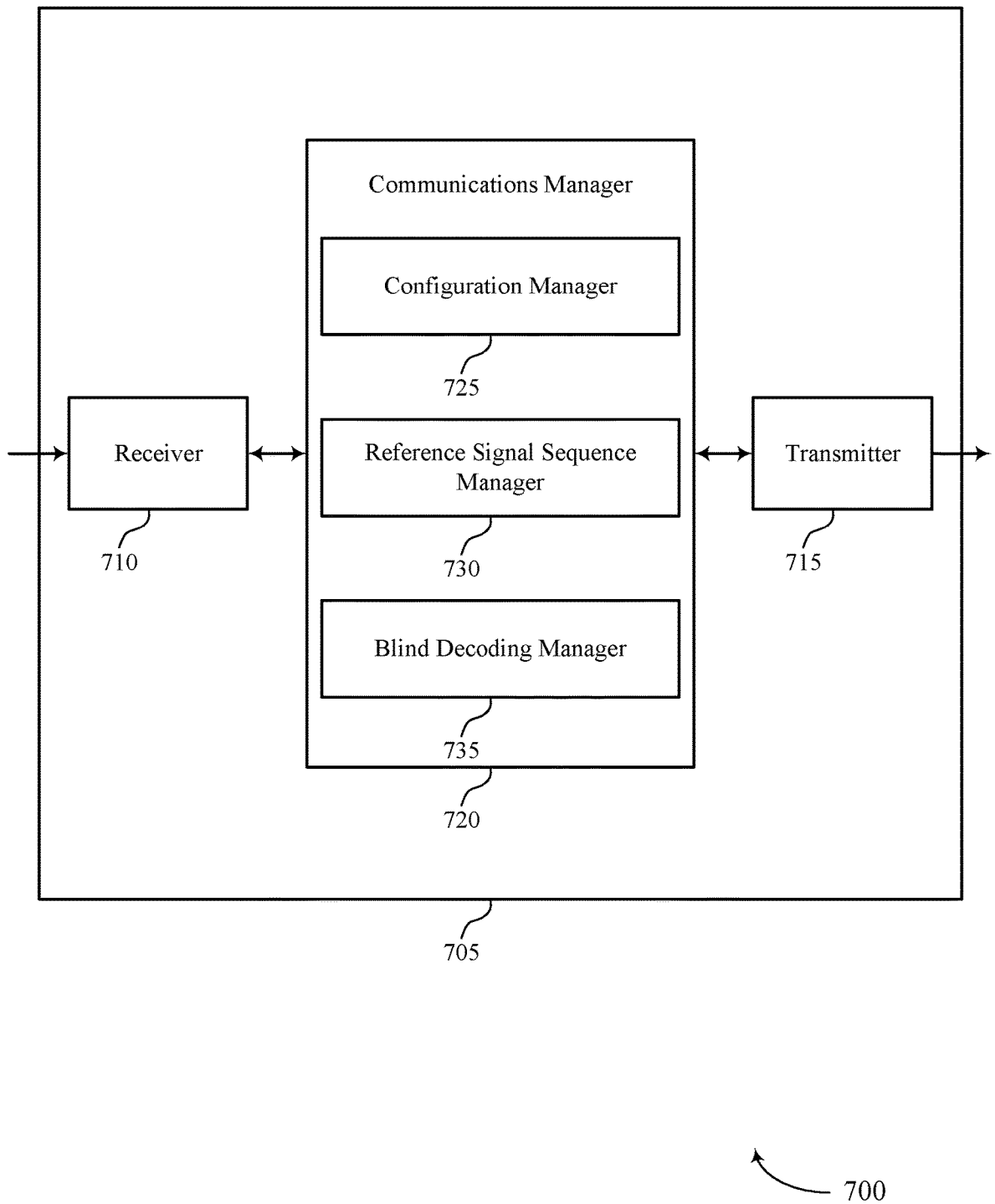

FIG. 7 shows a block diagram 700 of a device 705 that supports techniques for identifying control channel candidates based on reference signal sequences in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for identifying control channel candidates based on reference signal sequences). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for identifying control channel candidates based on reference signal sequences). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for identifying control channel candidates based on reference signal sequences as described herein. For example, the communications manager 720 may include a configuration manager 725, a reference signal sequence manager 730, a blind decoding manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The configuration manager 725 may be configured as or otherwise support a means for receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations. The reference signal sequence manager 730 may be configured as or otherwise support a means for detecting a first reference signal sequence of the two or more reference signal sequences in a reference signal transmission in the search space occasion. The blind decoding manager 735 may be configured as or otherwise support a means for identifying, based on the detecting the first reference signal sequence, a first subset of the two or more subsets of control channel candidate locations for a blind decoding procedure associated with the control channel communication.

Figure 8:
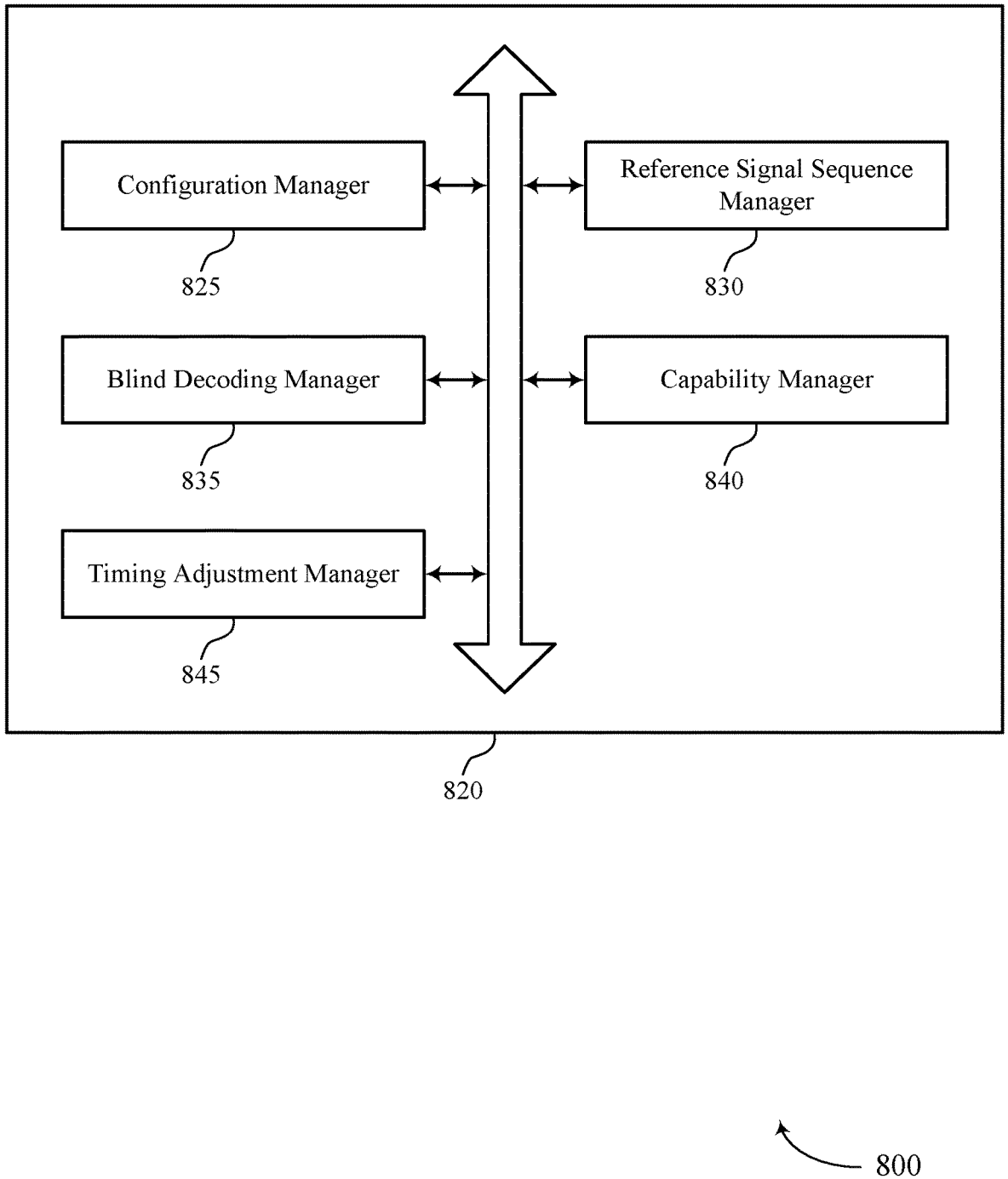
FIG. 8 shows a block diagram of a communications manager that supports techniques for identifying control channel candidates based on reference signal sequences in accordance with aspects of the present disclosure.

FIG. 8 shows a block diagram 800 of a communications manager 820 that supports techniques for identifying control channel candidates based on reference signal sequences in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for identifying control channel candidates based on reference signal sequences as described herein. For example, the communications manager 820 may include a configuration manager 825, a reference signal sequence manager 830, a blind decoding manager 835, a capability manager 840, a timing adjustment manager 845, or any combination thereof. Each of these components may communicate, directly or indirectly, with one another (e.g., via one or more buses).

The communications manager 820 may support wireless communication at a UE in accordance with examples as disclosed herein. The configuration manager 825 may be configured as or otherwise support a means for receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations. The reference signal sequence manager 830 may be configured as or otherwise support a means for detecting a first reference signal sequence of the two or more reference signal sequences in a reference signal transmission in the search space occasion. The blind decoding manager 835 may be configured as or otherwise support a means for identifying, based on the detecting the first reference signal sequence, a first subset of the two or more subsets of control channel candidate locations for a blind decoding procedure associated with the control channel communication.

In some examples, the first reference signal sequence indicates that the control channel communication is present in the first subset of the control channel candidate locations, and a second reference signal sequence of the two or more reference signal sequences indicates an absence of the control channel communication in the first subset of control channel candidate locations. In some examples, the first subset of the two or more subsets of control channel candidate locations include fewer than all available control channel candidate locations in the search space occasion, and a second subset of the two or more subsets of control channel candidate locations includes one or more control channel candidate locations that are different than the first subset of control channel candidate locations.

In some examples, the blind decoding manager 835 may be configured as or otherwise support a means for performing the blind decoding procedure on a first control channel candidate location of the first subset of the two or more subsets of control channel candidate locations. In some examples, the blind decoding manager 835 may be configured as or otherwise support a means for performing the blind decoding procedure on at least a second control channel candidate location of the first subset of the two or more subsets of control channel candidate locations based on an unsuccessful blind decoding on the first control channel candidate location.

In some examples, the reference signal sequence manager 830 may be configured as or otherwise support a means for determining the two or more reference signal sequences based on the set of parameters provided with the control information, where the set of parameters include one or more time domain parameters associated with the search space occasion, one or more network identification parameters associated with the search space occasion, and one or more sequence shifting or scrambling patterns that provide two or more alternative sequences that correspond to the two or more reference signal sequences.

In some examples, to support detecting, the reference signal sequence manager 830 may be configured as or otherwise support a means for monitoring for each of the two or more reference signal sequences in a set of reference signal resources of the search space occasion. In some examples, to support detecting, the reference signal sequence manager 830 may be configured as or otherwise support a means for detecting that the first reference signal sequence is present in a reference signal that is transmitted in the set of reference signal resources, and where the first subset of the two or more subsets of control channel candidate locations is associated with the first reference signal sequence and a second subset the two or more subsets of control channel candidate locations is associated with a second reference signal sequence of the two or more reference signal sequences.

In some examples, the reference signal transmission in the search space occasion is a wideband DMRS that spans all control channel candidate locations in the search space occasion, and is for use by a set of multiple UEs that monitor for control channel communications in the search space occasion. In some examples, the reference signal transmission in the search space occasion is a narrowband DMRS that spans only the first subset of the two or more subsets of control channel candidate locations in the search space occasion, and is for use by one or more UEs that are configured to monitor for the first reference signal sequence. In some examples, the reference signal transmission is transmitted in the first subset of control channel candidate locations without a corresponding control channel communication in the first subset of control channel candidate locations. In some examples, the two or more subsets of control channel candidate locations span two or more symbols of the search space occasion, and each symbol of the two or more symbols has an associated reference signal transmission, and where the first reference signal sequence is used for at least one of the two or more symbols.

In some examples, the capability manager 840 may be configured as or otherwise support a means for transmitting, to the base station, a capability indication that provides a capability of the UE to detect alternative reference signal sequences in one or more search space occasions. In some examples, the capability indication includes one or more of a capability to detect alternative DMRS sequences, a capability to receive wideband or narrowband DMRSs, a number of different DMRS sequences that can be concurrently monitored by the UE, a timing adjustment associated with DMRS sequence detection, or any combinations thereof.

In some examples, the timing adjustment manager 845 may be configured as or otherwise support a means for determining one or more timing adjustments for decoding the control channel communication or an associated shared channel communication based on the set of parameters for the two or more reference signal sequences. In some examples, the timing adjustment manager 845 may be configured as or otherwise support a means for decoding one or more of the control channel communication or the associated shared channel communication based on the one or more timing adjustments.

Figure 9:
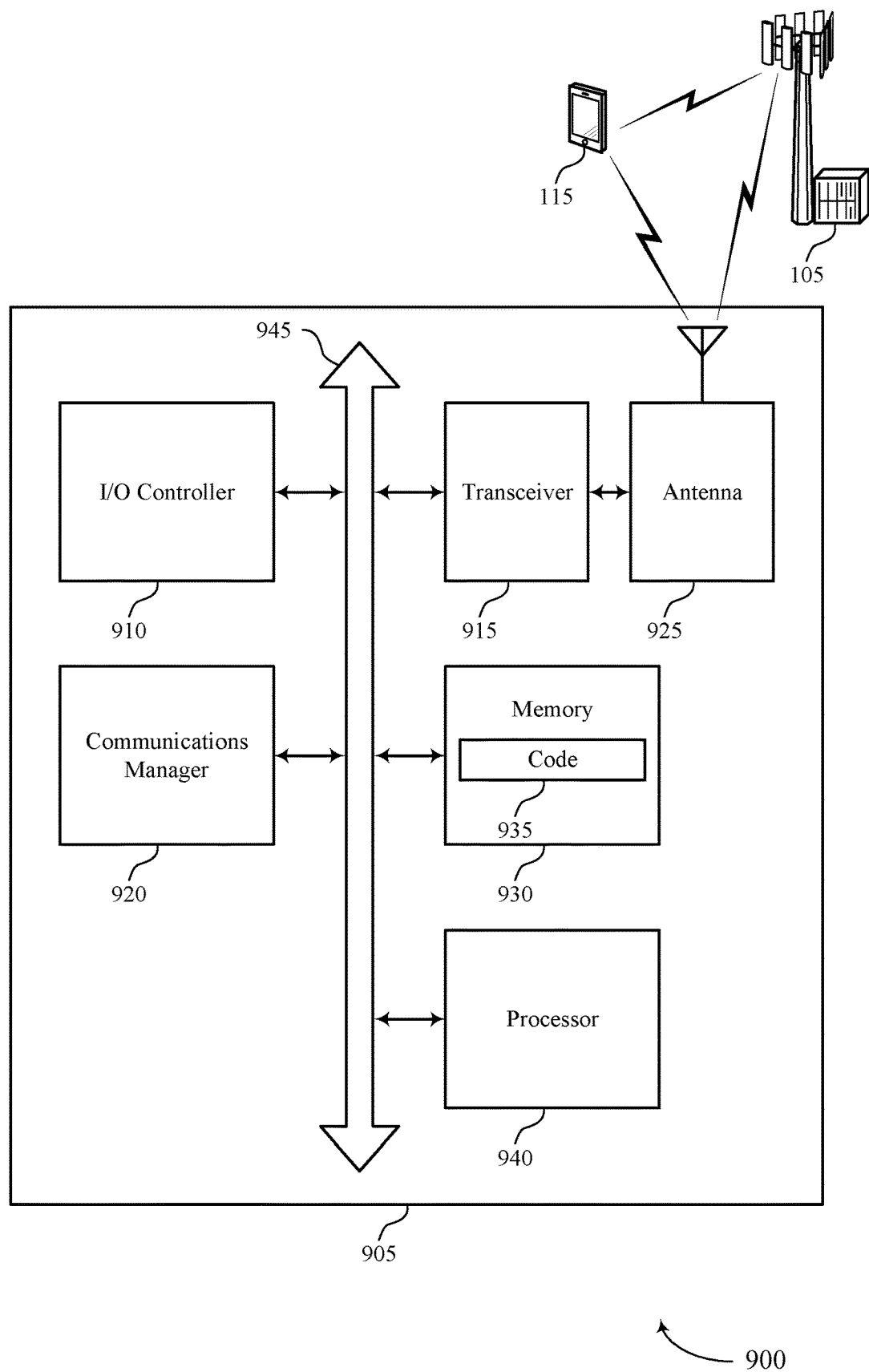
FIG. 9 shows a diagram of a system including a device that supports techniques for identifying control channel candidates based on reference signal sequences in accordance with aspects of the present disclosure.

FIG. 9 shows a diagram of a system 900 including a device 905 that supports techniques for identifying control channel candidates based on reference signal sequences in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for identifying control channel candidates based on reference signal sequences). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations. The communications manager 920 may be configured as or otherwise support a means for detecting a first reference signal sequence of the two or more reference signal sequences in a reference signal transmission in the search space occasion. The communications manager 920 may be configured as or otherwise support a means for identifying, based on the detecting the first reference signal sequence, a first subset of the two or more subsets of control channel candidate locations for a blind decoding procedure associated with the control channel communication.

By including or configuring the communications manager 920 in accordance with examples as described herein, the device 905 may support techniques for identifying control channel decoding candidates based on reference signal sequences, where the identified candidates for blind decoding are less than a total number of available blind decoding candidates. Such techniques may reduce an amount of blind decodes performed by a receiving device, increase the efficiency of communication resources, reduce system latency, and save power at such devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for identifying control channel candidates based on reference signal sequences as described herein, or the processor 940 and the memory 930 may be otherwise configured to perform or support such operations.

Figure 10:
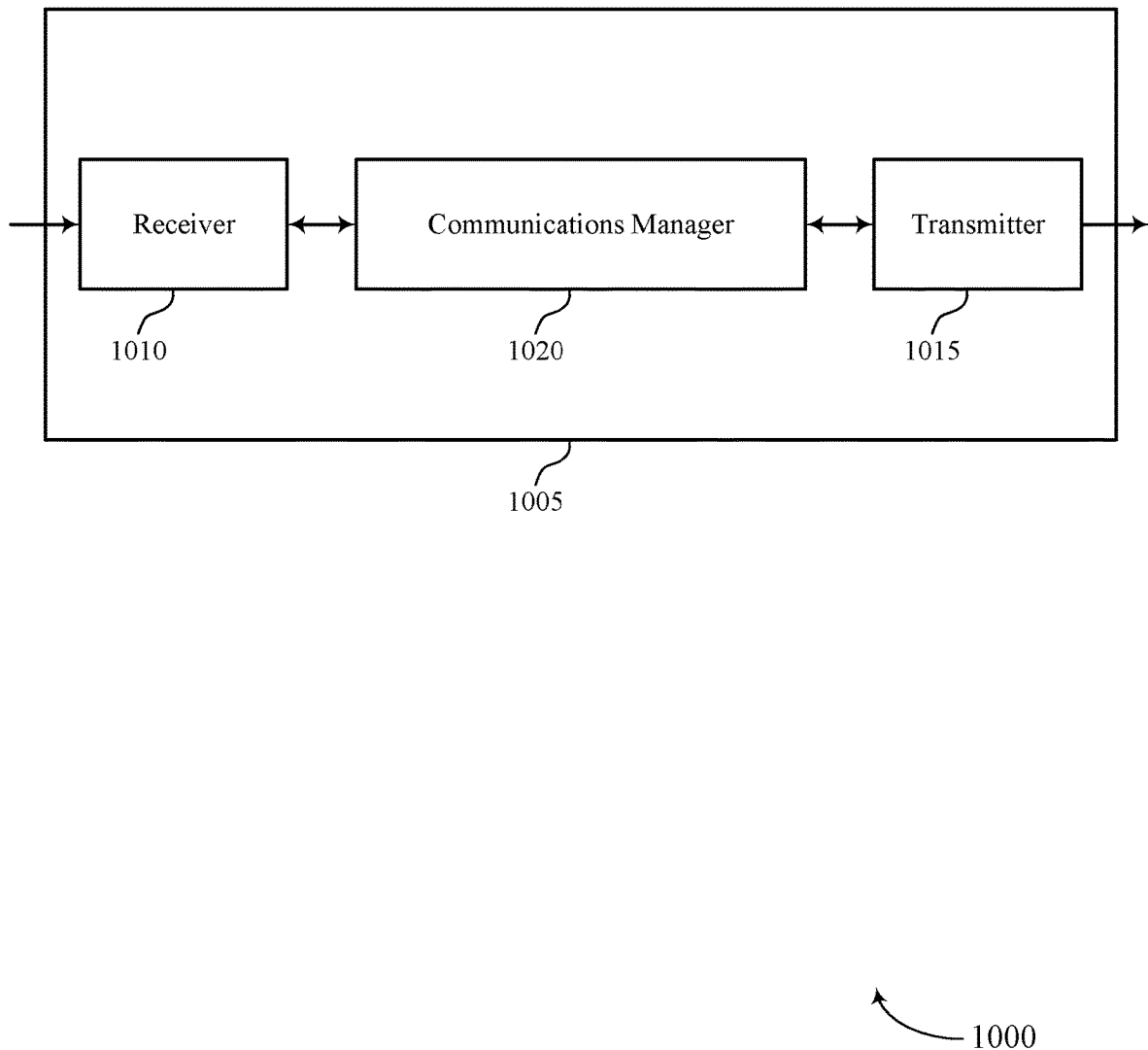
FIGS. 10 and 11 show block diagrams of devices that support techniques for identifying control channel candidates based on reference signal sequences in accordance with aspects of the present disclosure.

FIG. 10 shows a block diagram 1000 of a device 1005 that supports techniques for identifying control channel candidates based on reference signal sequences in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for identifying control channel candidates based on reference signal sequences). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for identifying control channel candidates based on reference signal sequences). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for identifying control channel candidates based on reference signal sequences as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations. The communications manager 1020 may be configured as or otherwise support a means for selecting a first control channel candidate location for the control channel communication. The communications manager 1020 may be configured as or otherwise support a means for determining a first reference signal sequence of the two or more reference signal sequences in the search space occasion based on the first control channel candidate location being in a first subset of the two or more subsets of control channel candidate locations. The communications manager 1020 may be configured as or otherwise support a means for transmitting a reference signal using the first reference signal sequence and the control channel communication in the first control channel candidate location.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for selecting reference signal sequences that indicate control channel decoding candidates, where the reference signal sequences indicate a subset of candidates for blind decoding are less than a total number of available blind decoding candidates. Such techniques may reduce an amount of blind decodes performed by a receiving device while also providing enhanced flexibility at a transmitting device for multiplexing multiple receiving devices, thereby increasing the efficiency of communication resources, reducing system latency, and saving power at such devices.

Figure 11:
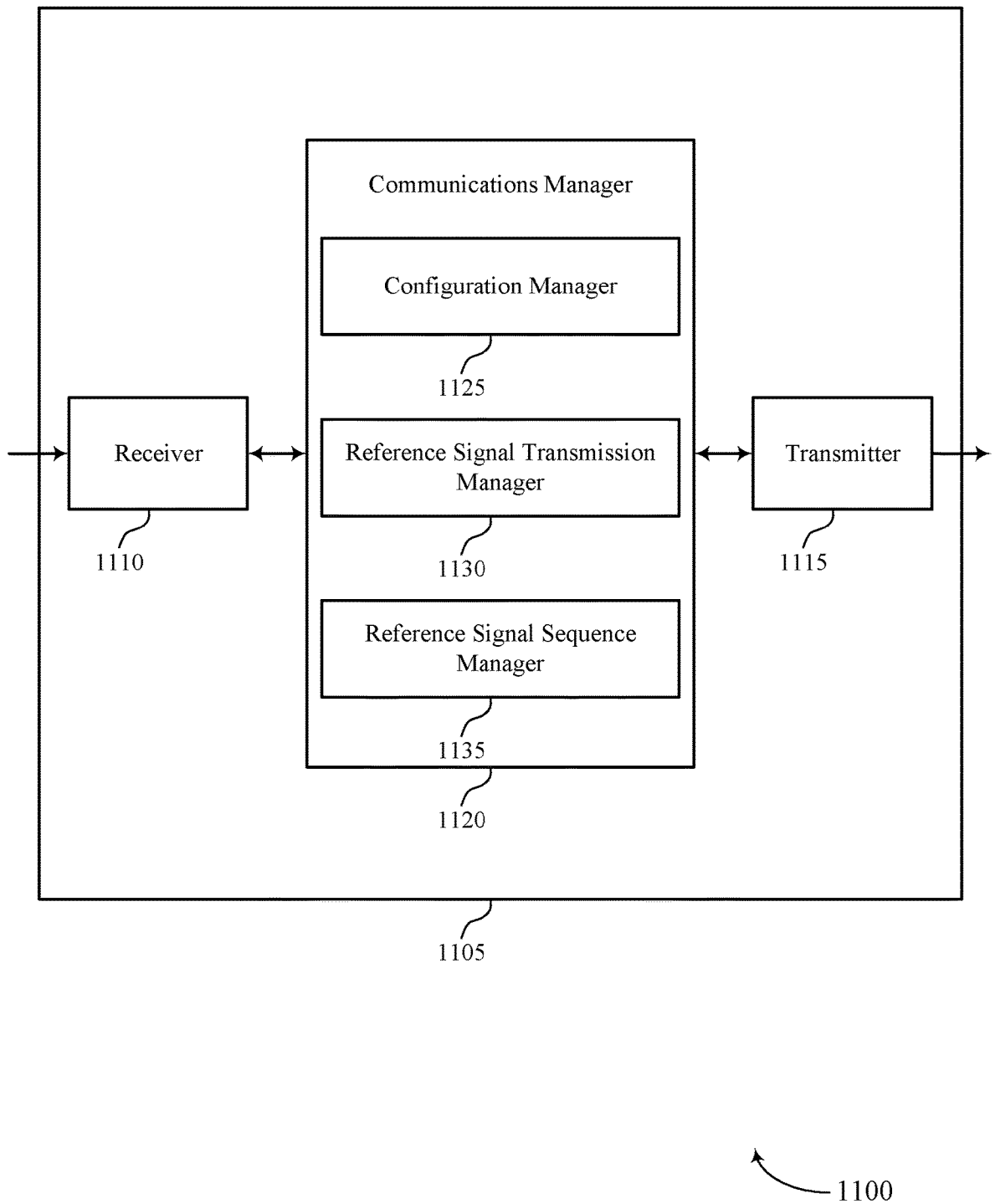

FIG. 11 shows a block diagram 1100 of a device 1105 that supports techniques for identifying control channel candidates based on reference signal sequences in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for identifying control channel candidates based on reference signal sequences). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for identifying control channel candidates based on reference signal sequences). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for identifying control channel candidates based on reference signal sequences as described herein. For example, the communications manager 1120 may include a configuration manager 1125, a reference signal transmission manager 1130, a reference signal sequence manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The configuration manager 1125 may be configured as or otherwise support a means for transmitting, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations. The reference signal transmission manager 1130 may be configured as or otherwise support a means for selecting a first control channel candidate location for the control channel communication. The reference signal sequence manager 1135 may be configured as or otherwise support a means for determining a first reference signal sequence of the two or more reference signal sequences in the search space occasion based on the first control channel candidate location being in a first subset of the two or more subsets of control channel candidate locations. The reference signal transmission manager 1130 may be configured as or otherwise support a means for transmitting a reference signal using the first reference signal sequence and the control channel communication in the first control channel candidate location.

Figure 12:
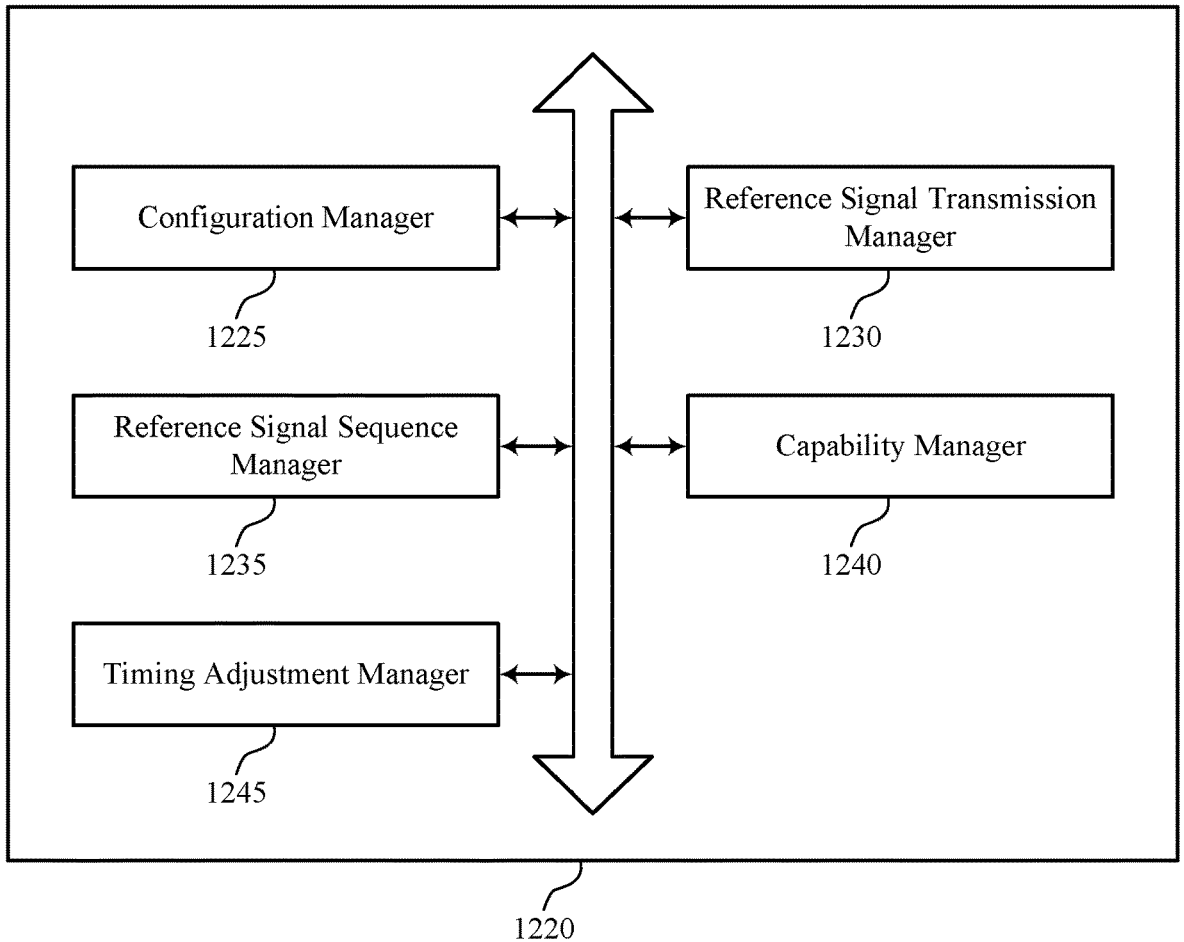
FIG. 12 shows a block diagram of a communications manager that supports techniques for identifying control channel candidates based on reference signal sequences in accordance with aspects of the present disclosure.

FIG. 12 shows a block diagram 1200 of a communications manager 1220 that supports techniques for identifying control channel candidates based on reference signal sequences in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for identifying control channel candidates based on reference signal sequences as described herein. For example, the communications manager 1220 may include a configuration manager 1225, a reference signal transmission manager 1230, a reference signal sequence manager 1235, a capability manager 1240, a timing adjustment manager 1245, or any combination thereof. Each of these components may communicate, directly or indirectly, with one another (e.g., via one or more buses).

The communications manager 1220 may support wireless communication at a base station in accordance with examples as disclosed herein. The configuration manager 1225 may be configured as or otherwise support a means for transmitting, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations. The reference signal transmission manager 1230 may be configured as or otherwise support a means for selecting a first control channel candidate location for the control channel communication. The reference signal sequence manager 1235 may be configured as or otherwise support a means for determining a first reference signal sequence of the two or more reference signal sequences in the search space occasion based on the first control channel candidate location being in a first subset of the two or more subsets of control channel candidate locations. In some examples, the reference signal transmission manager 1230 may be configured as or otherwise support a means for transmitting a reference signal using the first reference signal sequence and the control channel communication in the first control channel candidate location.

In some examples, the first reference signal sequence indicates that the control channel communication is present in the first subset of control channel candidate locations, and a second reference signal sequence of the two or more reference signal sequences indicates an absence of the control channel communication in the first subset of control channel candidate locations. In some examples, the first subset of the two or more subsets of control channel candidate locations include fewer than all available control channel candidate locations in the search space occasion, and a second subset of the two or more subsets of control channel candidate locations includes one or more control channel candidate locations that are different than the first subset of control channel candidate locations.

In some examples, the reference signal sequence manager 1235 may be configured as or otherwise support a means for determining the two or more reference signal sequences based on the set of parameters provided with the control information, where the set of parameters include one or more time domain parameters associated with the search space occasion, one or more network identification parameters associated with the search space occasion, and one or more sequence shifting or scrambling patterns that provide two or more alternative sequences that correspond to the two or more reference signal sequences.

In some examples, the reference signal in the search space occasion is a wideband DMRS that spans all control channel candidate locations in the search space occasion, and is for use by a set of multiple UEs that monitor for control channel communications in the search space occasion. In some examples, the reference signal in the search space occasion is a narrowband DMRS that spans only the first subset of the two or more subsets of control channel candidate locations in the search space occasion, and is for use by one or more UEs that are configured to monitor for the first reference signal sequence. In some examples, the two or more subsets of control channel candidate locations span two or more symbols of the search space occasion, and each symbol of the two or more symbols has an associated reference signal transmission, and where the first reference signal sequence is used for at least one of the two or more symbols.

In some examples, the capability manager 1240 may be configured as or otherwise support a means for receiving, from the UE, a capability indication that provides a capability of the UE to detect alternative reference signal sequences in one or more search space occasions.

In some examples, the capability indication includes one or more of a capability to detect alternative DMRS sequences, a capability to receive wideband or narrowband DMRSs, a number of different DMRS sequences that can be concurrently monitored by the UE, a timing adjustment associated with DMRS sequence detection, or any combinations thereof. In some examples, the timing adjustment manager 1245 may be configured as or otherwise support a means for configuring one or more timing adjustments at the UE for decoding the control channel communication or an associated shared channel communication based on the set of parameters for the two or more reference signal sequences.

Figure 13:
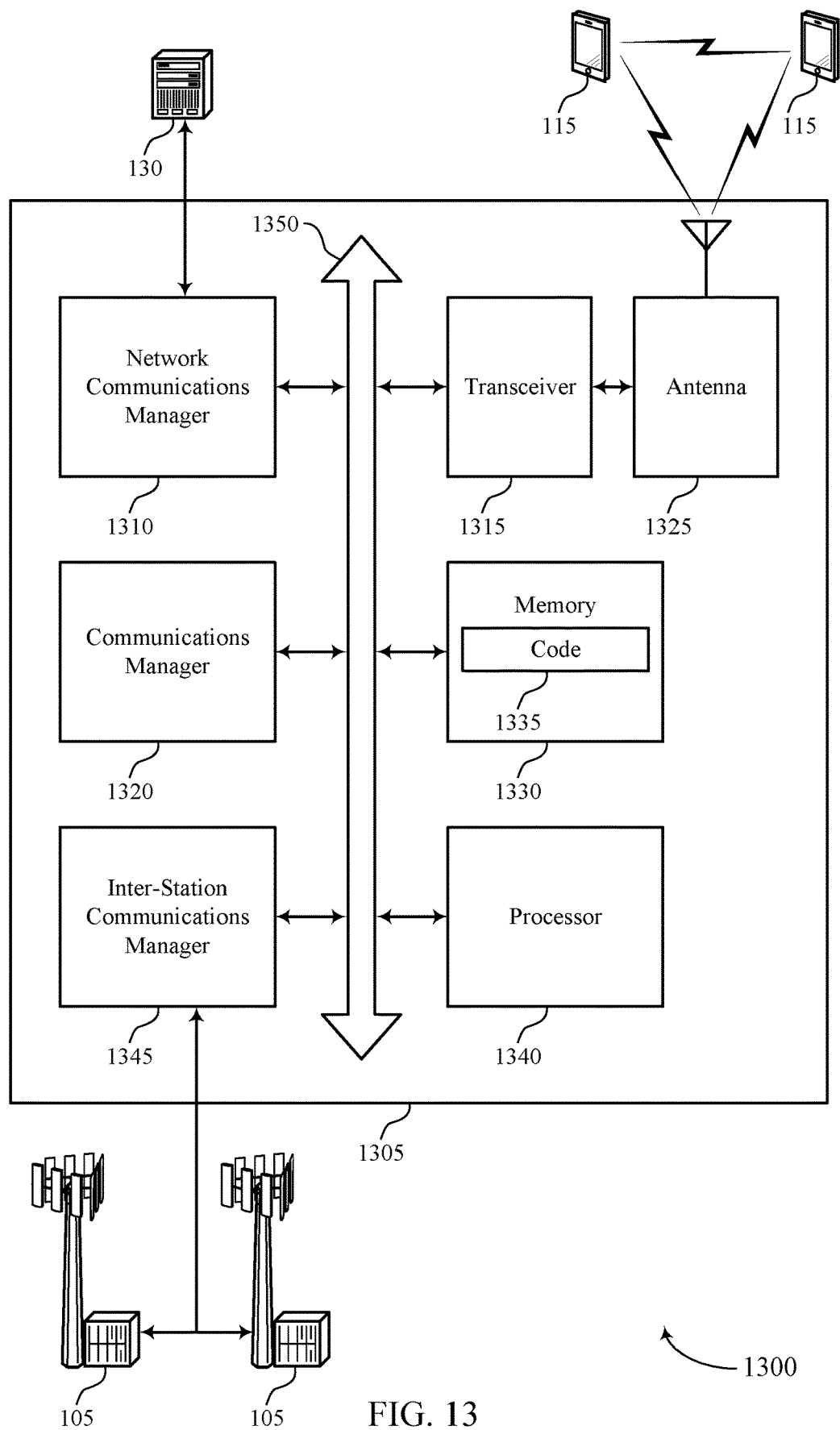
FIG. 13 shows a diagram of a system including a device that supports techniques for identifying control channel candidates based on reference signal sequences in accordance with aspects of the present disclosure.

FIG. 13 shows a diagram of a system 1300 including a device 1305 that supports techniques for identifying control channel candidates based on reference signal sequences in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for identifying control channel candidates based on reference signal sequences). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations. The communications manager 1320 may be configured as or otherwise support a means for selecting a first control channel candidate location for the control channel communication. The communications manager 1320 may be configured as or otherwise support a means for determining a first reference signal sequence of the two or more reference signal sequences in the search space occasion based on the first control channel candidate location being in a first subset of the two or more subsets of control channel candidate locations. The communications manager 1320 may be configured as or otherwise support a means for transmitting a reference signal using the first reference signal sequence and the control channel communication in the first control channel candidate location.

By including or configuring the communications manager 1320 in accordance with examples as described herein, the device 1305 may support techniques for selecting reference signal sequences that indicate control channel decoding candidates, where the reference signal sequences indicate a subset of candidates for blind decoding are less than a total number of available blind decoding candidates. Such techniques may reduce an amount of blind decodes performed by a receiving device while also providing enhanced flexibility at a transmitting device for multiplexing multiple receiving devices, thereby increasing the efficiency of communication resources, reducing system latency, and saving power at such devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for identifying control channel candidates based on reference signal sequences as described herein, or the processor 1340 and the memory 1330 may be otherwise configured to perform or support such operations.

Figure 14:
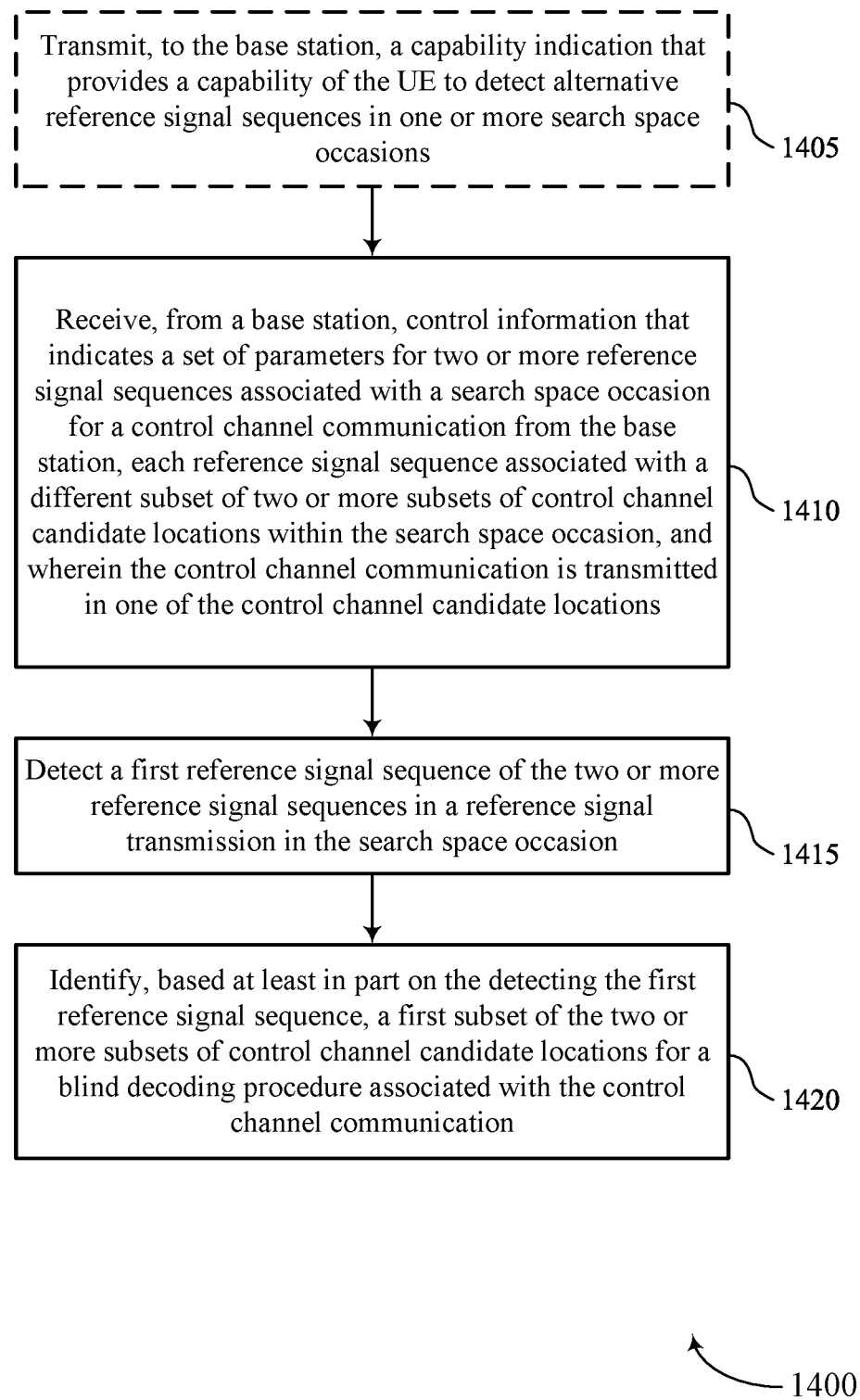
FIGS. 14 through 20 show flowcharts illustrating methods that support techniques for identifying control channel candidates based on reference signal sequences in accordance with aspects of the present disclosure.

FIG. 14 shows a flowchart illustrating a method 1400 that supports techniques for identifying control channel candidates based on reference signal sequences in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

Optionally, at 1405, the method may include transmitting, to the base station, a capability indication that provides a capability of the UE to detect alternative reference signal sequences in one or more search space occasions. The operations of 1405 may be performed in accordance with examples as disclosed herein. In some examples, aspects of the operations of 1405 may be performed by a capability manager 840 as described with reference to FIG. 8.

At 1410, the method may include receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations. The operations of 1410 may be performed in accordance with examples as disclosed herein. In some examples, aspects of the operations of 1410 may be performed by a configuration manager 825 as described with reference to FIG. 8.

At 1415, the method may include detecting a first reference signal sequence of the two or more reference signal sequences in a reference signal transmission in the search space occasion. The operations of 1415 may be performed in accordance with examples as disclosed herein. In some examples, aspects of the operations of 1415 may be performed by a reference signal sequence manager 830 as described with reference to FIG. 8.

At 1420, the method may include identifying, based on the detecting the first reference signal sequence, a first subset of the two or more subsets of control channel candidate locations for a blind decoding procedure associated with the control channel communication. The operations of 1420 may be performed in accordance with examples as disclosed herein. In some examples, aspects of the operations of 1420 may be performed by a blind decoding manager 835 as described with reference to FIG. 8.

Figure 15:
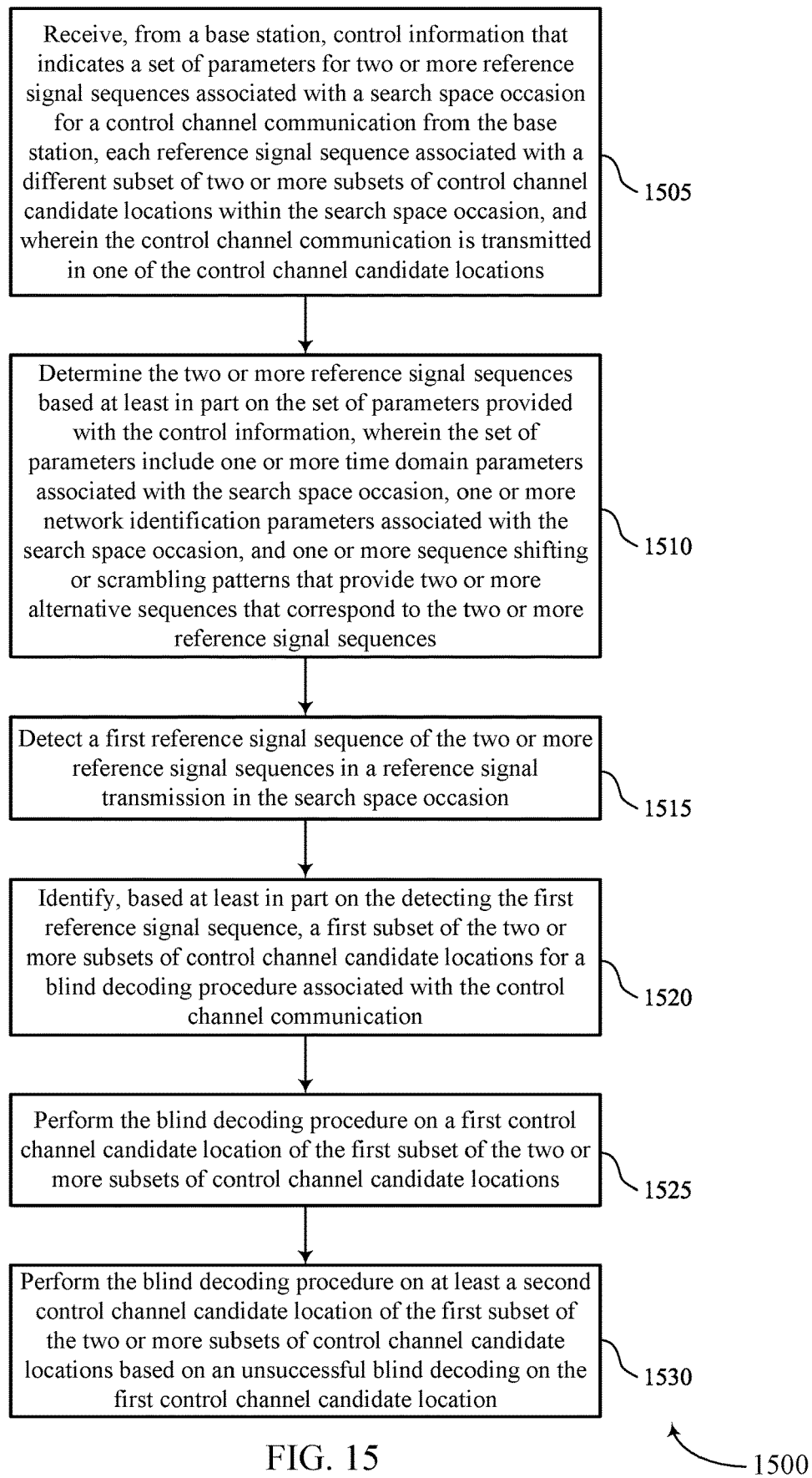

FIG. 15 shows a flowchart illustrating a method 1500 that supports techniques for identifying control channel candidates based on reference signal sequences in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations. The operations of 1505 may be performed in accordance with examples as disclosed herein. In some examples, aspects of the operations of 1505 may be performed by a configuration manager 825 as described with reference to FIG. 8.

At 1510, the method may include determining the two or more reference signal sequences based on the set of parameters provided with the control information, where the set of parameters include one or more time domain parameters associated with the search space occasion, one or more network identification parameters associated with the search space occasion, and one or more sequence shifting or scrambling patterns that provide two or more alternative sequences that correspond to the two or more reference signal sequences. The operations of 1510 may be performed in accordance with examples as disclosed herein. In some examples, aspects of the operations of 1510 may be performed by a reference signal sequence manager 830 as described with reference to FIG. 8.

At 1515, the method may include detecting a first reference signal sequence of the two or more reference signal sequences in a reference signal transmission in the search space occasion. The operations of 1515 may be performed in accordance with examples as disclosed herein. In some examples, aspects of the operations of 1515 may be performed by a reference signal sequence manager 830 as described with reference to FIG. 8.

At 1520, the method may include identifying, based on the detecting the first reference signal sequence, a first subset of the two or more subsets of control channel candidate locations for a blind decoding procedure associated with the control channel communication. The operations of 1520 may be performed in accordance with examples as disclosed herein. In some examples, aspects of the operations of 1520 may be performed by a blind decoding manager 835 as described with reference to FIG. 8.

At 1525, the method may include performing the blind decoding procedure on a first control channel candidate location of the first subset of the two or more subsets of control channel candidate locations. The operations of 1525 may be performed in accordance with examples as disclosed herein. In some examples, aspects of the operations of 1525 may be performed by a blind decoding manager 835 as described with reference to FIG. 8.

At 1530, the method may include performing the blind decoding procedure on at least a second control channel candidate location of the first subset of the two or more subsets of control channel candidate locations based on an unsuccessful blind decoding on the first control channel candidate location. The operations of 1530 may be performed in accordance with examples as disclosed herein. In some examples, aspects of the operations of 1530 may be performed by a blind decoding manager 835 as described with reference to FIG. 8.

Figure 16:
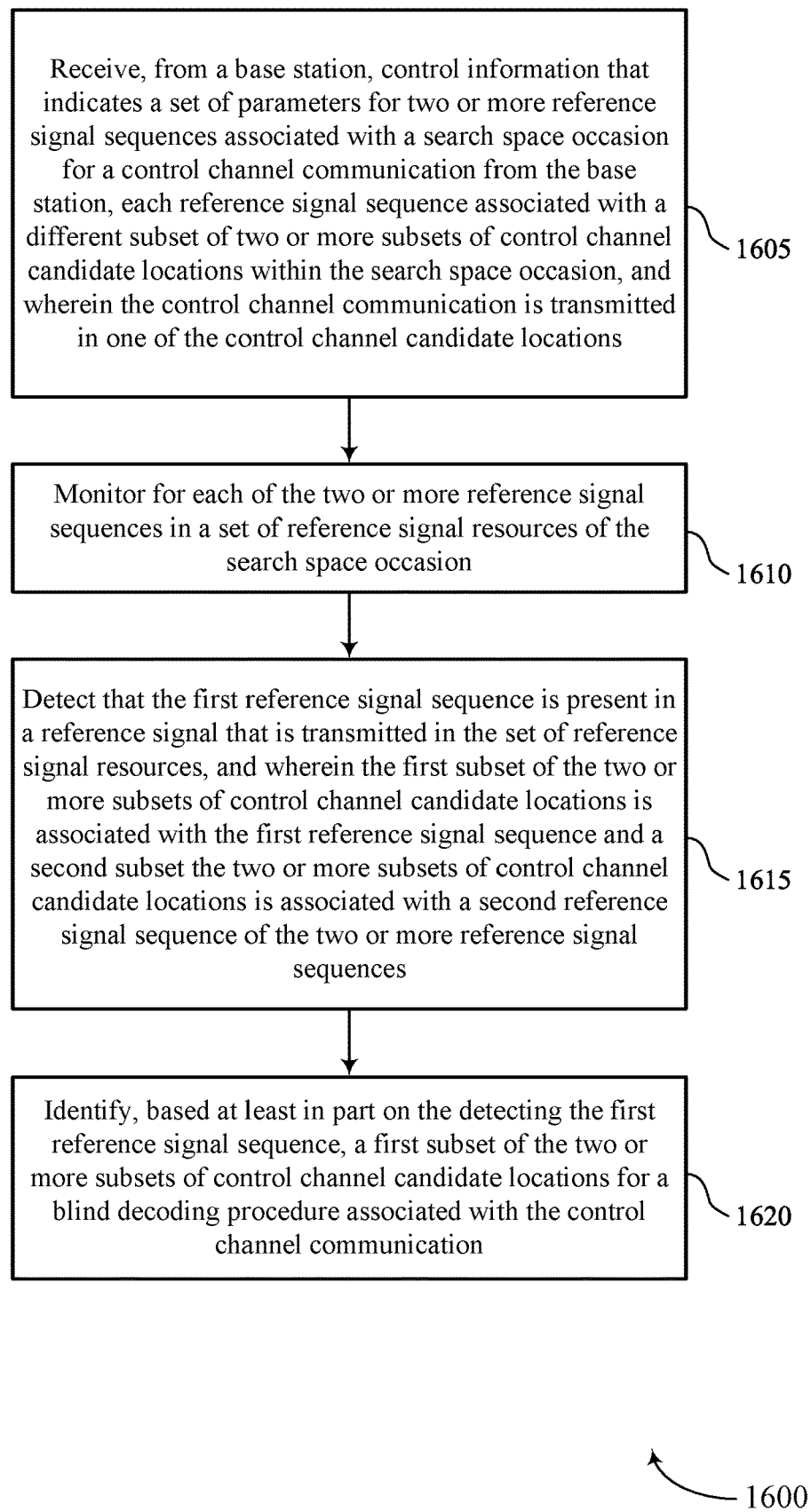

FIG. 16 shows a flowchart illustrating a method 1600 that supports techniques for identifying control channel candidates based on reference signal sequences in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations. The operations of 1605 may be performed in accordance with examples as disclosed herein. In some examples, aspects of the operations of 1605 may be performed by a configuration manager 825 as described with reference to FIG. 8.

At 1610, the method may include monitoring for each of the two or more reference signal sequences in a set of reference signal resources of the search space occasion. The operations of 1610 may be performed in accordance with examples as disclosed herein. In some examples, aspects of the operations of 1610 may be performed by a reference signal sequence manager 830 as described with reference to FIG. 8.

At 1615, the method may include detecting that the first reference signal sequence is present in a reference signal that is transmitted in the set of reference signal resources, and where the first subset of the two or more subsets of control channel candidate locations is associated with the first reference signal sequence and a second subset the two or more subsets of control channel candidate locations is associated with a second reference signal sequence of the two or more reference signal sequences. The operations of 1615 may be performed in accordance with examples as disclosed herein. In some examples, aspects of the operations of 1615 may be performed by a reference signal sequence manager 830 as described with reference to FIG. 8.

At 1620, the method may include identifying, based on the detecting the first reference signal sequence, a first subset of the two or more subsets of control channel candidate locations for a blind decoding procedure associated with the control channel communication. The operations of 1620 may be performed in accordance with examples as disclosed herein. In some examples, aspects of the operations of 1620 may be performed by a blind decoding manager 835 as described with reference to FIG. 8.

Figure 17:
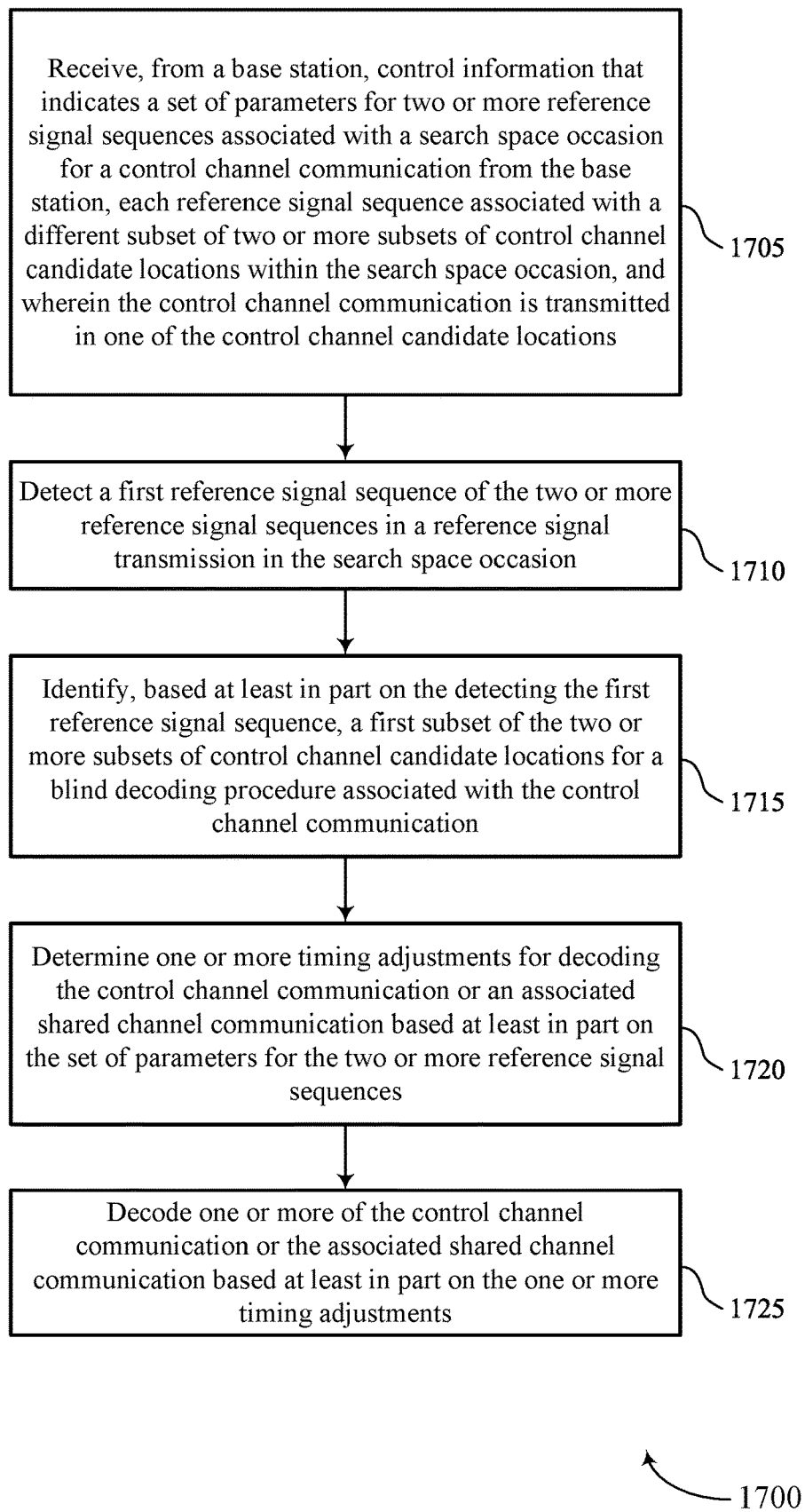

FIG. 17 shows a flowchart illustrating a method 1700 that supports techniques for identifying control channel candidates based on reference signal sequences in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and where the control channel communication is transmitted in one of the control channel candidate locations. The operations of 1705 may be performed in accordance with examples as disclosed herein. In some examples, aspects of the operations of 1705 may be performed by a configuration manager 825 as described with reference to FIG. 8.

At 1710, the method may include detecting a first reference signal sequence of the two or more reference signal sequences in a reference signal transmission in the search space occasion. The operations of 1710 may be performed in accordance with examples as disclosed herein. In some examples, aspects of the operations of 1710 may be performed by a reference signal sequence manager 830 as described with reference to FIG. 8.

At 1715, the method may include identifying, based on the detecting the first reference signal sequence, a first subset of the two or more subsets of control channel candidate locations for a blind decoding procedure associated with the control channel communication. The operations of 1715 may be performed in accordance with examples as disclosed herein. In some examples, aspects of the operations of 1715 may be performed by a blind decoding manager 835 as described with reference to FIG. 8.

At 1720, the method may include determining one or more timing adjustments for decoding the control channel communication or an associated shared channel communication based on the set of parameters for the two or more reference signal sequences. The operations of 1720 may be performed in accordance with examples as disclosed herein. In some examples, aspects of the operations of 1720 may be performed by a timing adjustment manager 845 as described with reference to FIG. 8.

At 1725, the method may include decoding one or more of the control channel communication or the associated shared channel communication based on the one or more timing adjustments. The operations of 1725 may be performed in accordance with examples as disclosed herein. In some examples, aspects of the operations of 1725 may be performed by a timing adjustment manager 845 as described with reference to FIG. 8.

Figure 18:
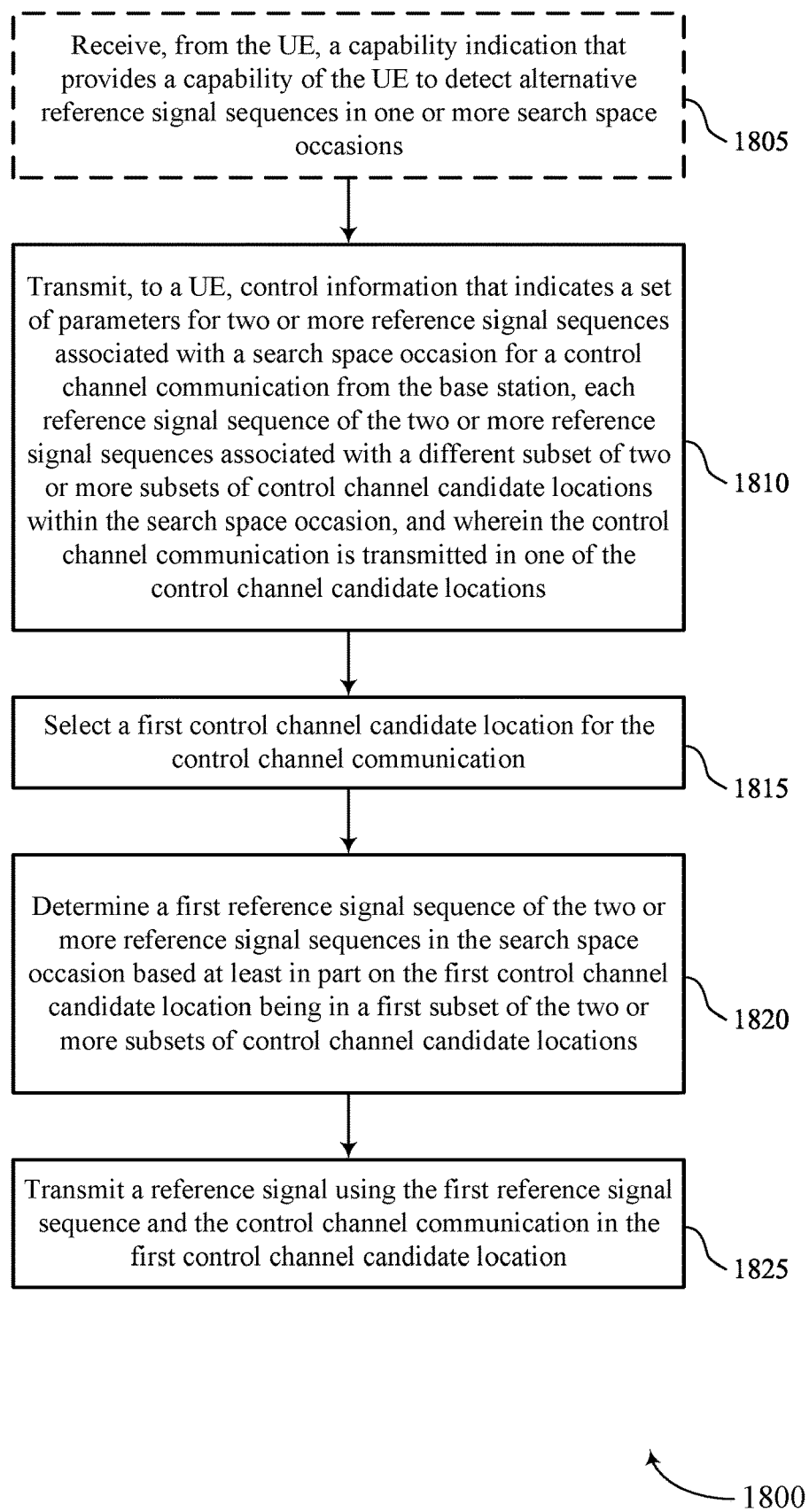

FIG. 18 shows a flowchart illustrating a method 1800 that supports techniques for identifying control channel candidates based on reference signal sequences in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

Optionally, at 1805, the method may include receiving, from the UE, a capability indication that provides a capability of the UE to detect alternative reference signal sequences in one or more search space occasions. The operations of 1805 may be performed in accordance with examples as disclosed herein. In some examples, aspects of the operations of 1805 may be performed by a capability manager 1240 as described with reference to FIG. 12.

At 1810, the method may include transmitting, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations. The operations of 1810 may be performed in accordance with examples as disclosed herein. In some examples, aspects of the operations of 1810 may be performed by a configuration manager 1225 as described with reference to FIG. 12.

At 1815, the method may include selecting a first control channel candidate location for the control channel communication. The operations of 1815 may be performed in accordance with examples as disclosed herein. In some examples, aspects of the operations of 1815 may be performed by a reference signal transmission manager 1230 as described with reference to FIG. 12.

At 1820, the method may include determining a first reference signal sequence of the two or more reference signal sequences in the search space occasion based on the first control channel candidate location being in a first subset of the two or more subsets of control channel candidate locations. The operations of 1820 may be performed in accordance with examples as disclosed herein. In some examples, aspects of the operations of 1820 may be performed by a reference signal sequence manager 1235 as described with reference to FIG. 12.

At 1825, the method may include transmitting a reference signal using the first reference signal sequence and the control channel communication in the first control channel candidate location. The operations of 1825 may be performed in accordance with examples as disclosed herein. In some examples, aspects of the operations of 1825 may be performed by a reference signal transmission manager 1230 as described with reference to FIG. 12.

Figure 19:
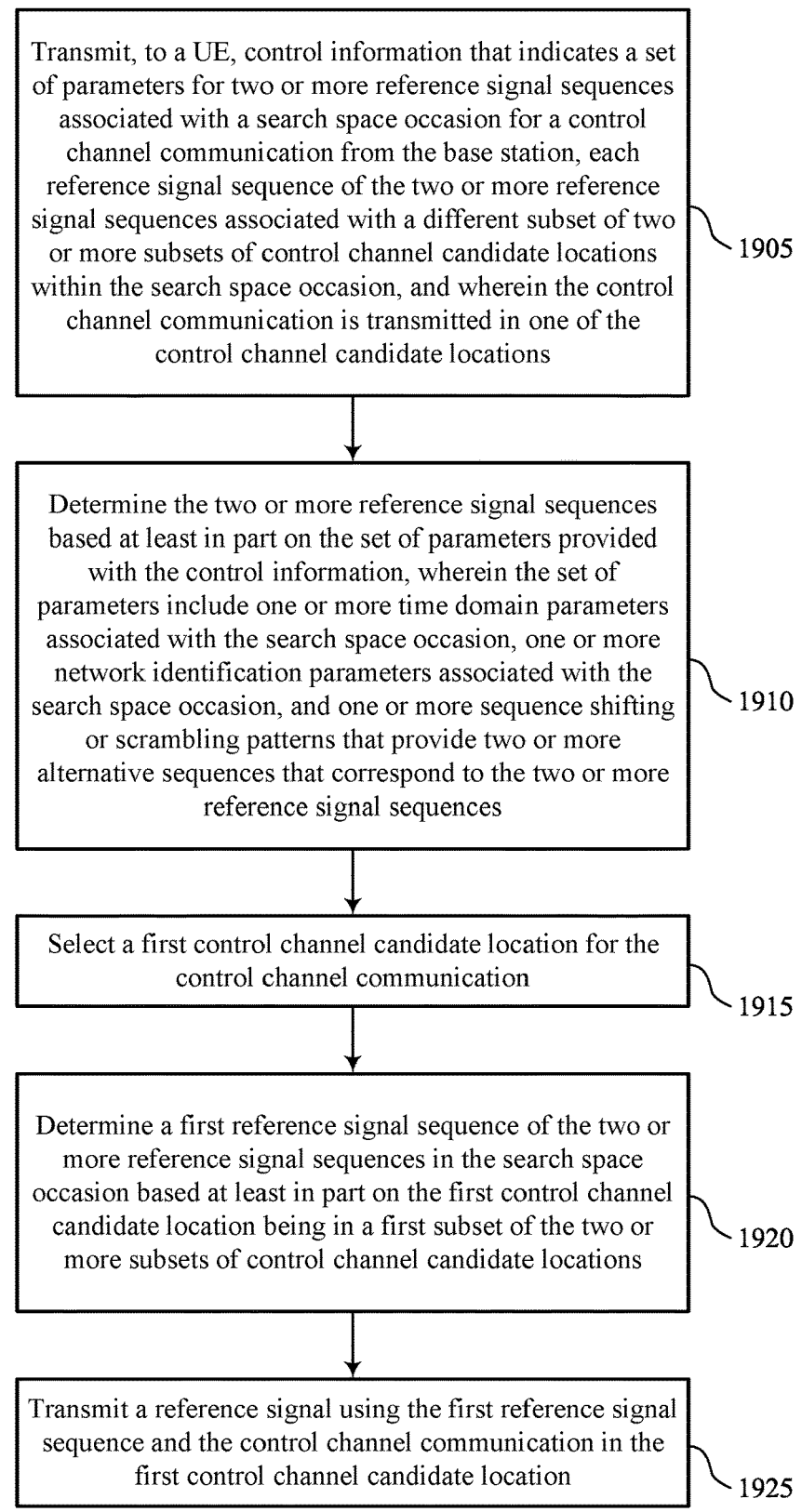

FIG. 19 shows a flowchart illustrating a method 1900 that supports techniques for identifying control channel candidates based on reference signal sequences in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations. The operations of 1905 may be performed in accordance with examples as disclosed herein. In some examples, aspects of the operations of 1905 may be performed by a configuration manager 1225 as described with reference to FIG. 12.

At 1910, the method may include determining the two or more reference signal sequences based on the set of parameters provided with the control information, where the set of parameters include one or more time domain parameters associated with the search space occasion, one or more network identification parameters associated with the search space occasion, and one or more sequence shifting or scrambling patterns that provide two or more alternative sequences that correspond to the two or more reference signal sequences. The operations of 1910 may be performed in accordance with examples as disclosed herein. In some examples, aspects of the operations of 1910 may be performed by a reference signal sequence manager 1235 as described with reference to FIG. 12.

At 1915, the method may include selecting a first control channel candidate location for the control channel communication. The operations of 1915 may be performed in accordance with examples as disclosed herein. In some examples, aspects of the operations of 1915 may be performed by a reference signal transmission manager 1230 as described with reference to FIG. 12.

At 1920, the method may include determining a first reference signal sequence of the two or more reference signal sequences in the search space occasion based on the first control channel candidate location being in a first subset of the two or more subsets of control channel candidate locations. The operations of 1920 may be performed in accordance with examples as disclosed herein. In some examples, aspects of the operations of 1920 may be performed by a reference signal sequence manager 1235 as described with reference to FIG. 12.

At 1925, the method may include transmitting a reference signal using the first reference signal sequence and the control channel communication in the first control channel candidate location. The operations of 1925 may be performed in accordance with examples as disclosed herein. In some examples, aspects of the operations of 1925 may be performed by a reference signal transmission manager 1230 as described with reference to FIG. 12.

Figure 20:
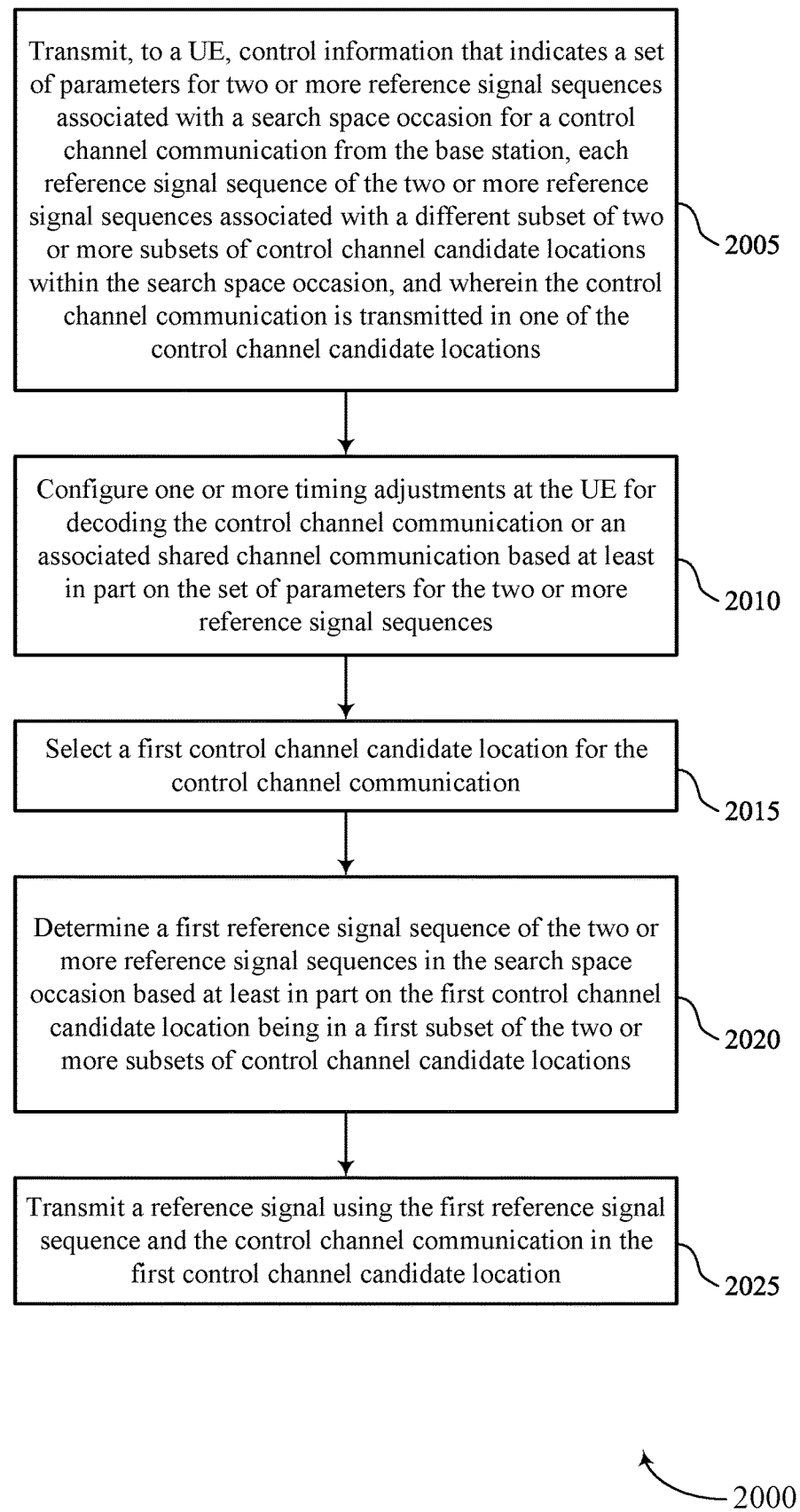

FIG. 20 shows a flowchart illustrating a method 2000 that supports techniques for identifying control channel candidates based on reference signal sequences in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and where the control channel communication is transmitted in one of the control channel candidate locations. The operations of 2005 may be performed in accordance with examples as disclosed herein. In some examples, aspects of the operations of 2005 may be performed by a configuration manager 1225 as described with reference to FIG. 12.

At 2010, the method may include configuring one or more timing adjustments at the UE for decoding the control channel communication or an associated shared channel communication based on the set of parameters for the two or more reference signal sequences. The operations of 2010 may be performed in accordance with examples as disclosed herein. In some examples, aspects of the operations of 2010 may be performed by a timing adjustment manager 1245 as described with reference to FIG. 12.

At 2015, the method may include selecting a first control channel candidate location for the control channel communication. The operations of 2015 may be performed in accordance with examples as disclosed herein. In some examples, aspects of the operations of 2015 may be performed by a reference signal transmission manager 1230 as described with reference to FIG. 12.

At 2020, the method may include determining a first reference signal sequence of the two or more reference signal sequences in the search space occasion based on the first control channel candidate location being in a first subset of the two or more subsets of control channel candidate locations. The operations of 2020 may be performed in accordance with examples as disclosed herein. In some examples, aspects of the operations of 2020 may be performed by a reference signal sequence manager 1235 as described with reference to FIG. 12.

At 2025, the method may include transmitting a reference signal using the first reference signal sequence and the control channel communication in the first control channel candidate location. The operations of 2025 may be performed in accordance with examples as disclosed herein. In some examples, aspects of the operations of 2025 may be performed by a reference signal transmission manager 1230 as described with reference to FIG. 12.

The following provides an overview of aspects of the present disclosure:

Aspect 1: A method for wireless communication at a UE, comprising: receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and wherein the control channel communication is transmitted in one of the control channel candidate locations; detecting a first reference signal sequence of the two or more reference signal sequences in a reference signal transmission in the search space occasion; and identifying, based at least in part on the detecting the first reference signal sequence, a first subset of the two or more subsets of control channel candidate locations for a blind decoding procedure associated with the control channel communication.

Aspect 2: The method of aspect 1, wherein the first reference signal sequence indicates that the control channel communication is present in the first subset of the control channel candidate locations, and a second reference signal sequence of the two or more reference signal sequences indicates an absence of the control channel communication in the first subset of control channel candidate locations.

Aspect 3: The method of any of aspects 1 through 2, wherein the first subset of the two or more subsets of control channel candidate locations include fewer than all available control channel candidate locations in the search space occasion, and a second subset of the two or more subsets of control channel candidate locations includes one or more control channel candidate locations that are different than the first subset of control channel candidate locations.

Aspect 4: The method of any of aspects 1 through 3, further comprising: performing the blind decoding procedure on a first control channel candidate location of the first subset of the two or more subsets of control channel candidate locations; and performing the blind decoding procedure on at least a second control channel candidate location of the first subset of the two or more subsets of control channel candidate locations based on an unsuccessful blind decoding on the first control channel candidate location.

Aspect 5: The method of any of aspects 1 through 4, further comprising: determining the two or more reference signal sequences based at least in part on the set of parameters provided with the control information, wherein the set of parameters include one or more time domain parameters associated with the search space occasion, one or more network identification parameters associated with the search space occasion, and one or more sequence shifting or scrambling patterns that provide two or more alternative sequences that correspond to the two or more reference signal sequences.

Aspect 6: The method of any of aspects 1 through 5, wherein the detecting comprises: monitoring for each of the two or more reference signal sequences in a set of reference signal resources of the search space occasion; and detecting that the first reference signal sequence is present in a reference signal that is transmitted in the set of reference signal resources, and wherein the first subset of the two or more subsets of control channel candidate locations is associated with the first reference signal sequence and a second subset the two or more subsets of control channel candidate locations is associated with a second reference signal sequence of the two or more reference signal sequences.

Aspect 7: The method of any of aspects 1 through 6, wherein the reference signal transmission in the search space occasion is a wideband DMRS that spans all control channel candidate locations in the search space occasion, and is for use by a plurality of UEs that monitor for control channel communications in the search space occasion.

Aspect 8: The method of any of aspects 1 through 6, wherein the reference signal transmission in the search space occasion is a narrowband DMRS that spans only the first subset of the two or more subsets of control channel candidate locations in the search space occasion, and is for use by one or more UEs that are configured to monitor for the first reference signal sequence.

Aspect 9: The method of any of aspects 1 through 8, wherein the reference signal transmission is transmitted in the first subset of control channel candidate locations without a corresponding control channel communication in the first subset of control channel candidate locations.

Aspect 10: The method of any of aspects 1 through 9, wherein the two or more subsets of control channel candidate locations span two or more symbols of the search space occasion, and each symbol of the two or more symbols has an associated reference signal transmission, and wherein the first reference signal sequence is used for at least one of the two or more symbols.

Aspect 11: The method of any of aspects 1 through 10, further comprising: transmitting, to the base station, a capability indication that provides a capability of the UE to detect alternative reference signal sequences in one or more search space occasions.

Aspect 12: The method of aspect 11, wherein the capability indication includes one or more of a capability to detect alternative DMRS sequences, a capability to receive wideband or narrowband DMRSs, a number of different DMRS sequences that can be concurrently monitored by the UE, a timing adjustment associated with DMRS sequence detection, or any combinations thereof.

Aspect 13: The method of any of aspects 1 through 12, further comprising: determining one or more timing adjustments for decoding the control channel communication or an associated shared channel communication based at least in part on the set of parameters for the two or more reference signal sequences; and decoding one or more of the control channel communication or the associated shared channel communication based at least in part on the one or more timing adjustments.

Aspect 14: A method for wireless communication at a base station, comprising: transmitting, to a UE, control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and wherein the control channel communication is transmitted in one of the control channel candidate locations; selecting a first control channel candidate location for the control channel communication; determining a first reference signal sequence of the two or more reference signal sequences in the search space occasion based at least in part on the first control channel candidate location being in a first subset of the two or more subsets of control channel candidate locations; and transmitting a reference signal using the first reference signal sequence and the control channel communication in the first control channel candidate location.

Aspect 15: The method of aspect 14, wherein the first reference signal sequence indicates that the control channel communication is present in the first subset of control channel candidate locations, and a second reference signal sequence of the two or more reference signal sequences indicates an absence of the control channel communication in the first subset of control channel candidate locations.

Aspect 16: The method of any of aspects 14 through 15, wherein the first subset of the two or more subsets of control channel candidate locations include fewer than all available control channel candidate locations in the search space occasion, and a second subset of the two or more subsets of control channel candidate locations includes one or more control channel candidate locations that are different than the first subset of control channel candidate locations.

Aspect 17: The method of any of aspects 14 through 16, further comprising: determining the two or more reference signal sequences based at least in part on the set of parameters provided with the control information, wherein the set of parameters include one or more time domain parameters associated with the search space occasion, one or more network identification parameters associated with the search space occasion, and one or more sequence shifting or scrambling patterns that provide two or more alternative sequences that correspond to the two or more reference signal sequences.

Aspect 18: The method of any of aspects 14 through 17, wherein the reference signal in the search space occasion is a wideband DMRS that spans all control channel candidate locations in the search space occasion, and is for use by a plurality of UEs that monitor for control channel communications in the search space occasion.

Aspect 19: The method of any of aspects 14 through 17, wherein the reference signal in the search space occasion is a narrowband DMRS that spans only the first subset of the two or more subsets of control channel candidate locations in the search space occasion, and is for use by one or more UEs that are configured to monitor for the first reference signal sequence.

Aspect 20: The method of any of aspects 14 through 19, wherein the two or more subsets of control channel candidate locations span two or more symbols of the search space occasion, and each symbol of the two or more symbols has an associated reference signal transmission, and wherein the first reference signal sequence is used for at least one of the two or more symbols.

Aspect 21: The method of any of aspects 14 through 20, further comprising: receiving, from the UE, a capability indication that provides a capability of the UE to detect alternative reference signal sequences in one or more search space occasions.

Aspect 22: The method of aspect 21, wherein the capability indication includes one or more of a capability to detect alternative DMRS sequences, a capability to receive wideband or narrowband DMRSs, a number of different DMRS sequences that can be concurrently monitored by the UE, a timing adjustment associated with DMRS sequence detection, or any combinations thereof.

Aspect 23: The method of any of aspects 14 through 22, further comprising: configuring one or more timing adjustments at the UE for decoding the control channel communication or an associated shared channel communication based at least in part on the set of parameters for the two or more reference signal sequences.

Aspect 24: An apparatus for wireless communication at a UE, comprising a processor; memory coupled with the processor; and instructions stored in the memory and executable by the processor to cause the apparatus to perform a method of any of aspects 1 through 13.

Aspect 25: An apparatus for wireless communication at a UE, comprising at least one means for performing a method of any of aspects 1 through 13.

Aspect 26: A non-transitory computer-readable medium storing code for wireless communication at a UE, the code comprising instructions executable by a processor to perform a method of any of aspects 1 through 13.

Aspect 27: An apparatus for wireless communication at a base station, comprising a processor; memory coupled with the processor; and instructions stored in the memory and executable by the processor to cause the apparatus to perform a method of any of aspects 14 through 23.

Aspect 28: An apparatus for wireless communication at a base station, comprising at least one means for performing a method of any of aspects 14 through 23.

Aspect 29: A non-transitory computer-readable medium storing code for wireless communication at a base station, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and wherein the control channel communication is transmitted in one of the control channel candidate locations;
   determining the two or more reference signal sequences based at least in part on the set of parameters provided with the control information, wherein the set of parameters include one or more time domain parameters associated with the search space occasion, one or more network identification parameters associated with the search space occasion, or one or more sequence shifting or scrambling patterns that provide two or more alternative sequences that correspond to the two or more reference signal sequences;

detecting a first reference signal sequence of the two or more reference signal sequences in a reference signal transmission in the search space occasion; and identifying, based at least in part on the detecting the first reference signal sequence, a first subset of the two or more subsets of control channel candidate locations for a blind decoding procedure associated with the control channel communication.

2. The method of claim 1, wherein the first reference signal sequence indicates that the control channel communication is present in the first subset of control channel candidate locations, and a second reference signal sequence of the two or more reference signal sequences indicates an absence of the control channel communication in the first subset of control channel candidate locations.

3. The method of claim 1, wherein the first subset of the two or more subsets of control channel candidate locations include fewer than all available control channel candidate locations in the search space occasion, and a second subset of the two or more subsets of control channel candidate locations includes one or more control channel candidate locations that are different than the first subset of control channel candidate locations.

4. The method of claim 1, further comprising:
performing the blind decoding procedure on a first control channel candidate location of the first subset of the two or more subsets of control channel candidate locations; and
performing the blind decoding procedure on at least a second control channel candidate location of the first subset of the two or more subsets of control channel candidate locations based on an unsuccessful blind decoding on the first control channel candidate location.

5. The method of claim 1, wherein the detecting comprises:
monitoring for each of the two or more reference signal sequences in a set of reference signal resources of the search space occasion; and
detecting that the first reference signal sequence is present in a reference signal that is transmitted in the set of reference signal resources, and wherein the first subset of the two or more subsets of control channel candidate locations is associated with the first reference signal sequence and a second subset the two or more subsets of control channel candidate locations is associated with a second reference signal sequence of the two or more reference signal sequences.

6. The method of claim 1, wherein the reference signal transmission in the search space occasion is a wideband demodulation reference signal (DMRS) that spans all control channel candidate locations in the search space occasion, and is for use by a plurality of UEs that monitor for control channel communications in the search space occasion.

7. The method of claim 1, wherein the reference signal transmission in the search space occasion is a narrowband demodulation reference signal (DMRS) that spans only the first subset of the two or more subsets of control channel candidate locations in the search space occasion, and is for use by one or more UEs that are configured to monitor for the first reference signal sequence.

8. The method of claim 1, wherein the reference signal transmission is transmitted in the first subset of control channel candidate locations without a corresponding control channel communication in the first subset of control channel candidate locations.

9. The method of claim 1, wherein the two or more subsets of control channel candidate locations span two or more symbols of the search space occasion, and each symbol of the two or more symbols has an associated reference signal transmission, and wherein the first reference signal sequence is used for at least one of the two or more symbols.

10. The method of claim 1, further comprising:
transmitting, to the base station, a capability indication that provides a capability of the UE to detect alternative reference signal sequences in one or more search space occasions.

11. The method of claim 10, wherein the capability indication includes one or more of a capability to detect alternative demodulation reference signal (DMRS) sequences, a capability to receive wideband or narrowband DMRSs, a number of different DMRS sequences that can be concurrently monitored by the UE, a timing adjustment associated with DMRS sequence detection, or any combinations thereof.

12. The method of claim 1, further comprising:
determining one or more timing adjustments for decoding the control channel communication or an associated shared channel communication based at least in part on the set of parameters for the two or more reference signal sequences; and
decoding one or more of the control channel communication or the associated shared channel communication based at least in part on the one or more timing adjustments.

13. A method for wireless communication at a base station, comprising:
transmitting, to a user equipment (UE), control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and wherein the control channel communication is transmitted in one of the control channel candidate locations;
determining the two or more reference signal sequences based at least in part on the set of parameters provided with the control information, wherein the set of parameters include one or more time domain parameters associated with the search space occasion, one or more network identification parameters associated with the search space occasion, or one or more sequence shifting or scrambling patterns that provide two or more alternative sequences that correspond to the two or more reference signal sequences;
selecting a first control channel candidate location for the control channel communication;
determining a first reference signal sequence of the two or more reference signal sequences in the search space occasion based at least in part on the first control channel candidate location being in a first subset of the two or more subsets of control channel candidate locations; and transmitting a reference signal using the first reference signal sequence and the control channel communication in the first control channel candidate location.

14. The method of claim 13, wherein the first reference signal sequence indicates that the control channel communication is present in the first subset of control channel candidate locations, and a second reference signal sequence of the two or more reference signal sequences indicates an absence of the control channel communication in the first subset of control channel candidate locations.

15. The method of claim 13, wherein the first subset of the two or more subsets of control channel candidate locations include fewer than all available control channel candidate locations in the search space occasion, and a second subset of the two or more subsets of control channel candidate locations includes one or more control channel candidate locations that are different than the first subset of control channel candidate locations.

16. The method of claim 13, wherein the reference signal in the search space occasion is a wideband demodulation reference signal (DMRS) that spans all control channel candidate locations in the search space occasion, and is for use by a plurality of UEs that monitor for control channel communications in the search space occasion.

17. The method of claim 13, wherein the reference signal in the search space occasion is a narrowband demodulation reference signal (DMRS) that spans only the first subset of the two or more subsets of control channel candidate locations in the search space occasion, and is for use by one or more UEs that are configured to monitor for the first reference signal sequence.

18. The method of claim 13, wherein the two or more subsets of control channel candidate locations span two or more symbols of the search space occasion, and each symbol of the two or more symbols has an associated reference signal transmission, and wherein the first reference signal sequence is used for at least one of the two or more symbols.

19. The method of claim 13, further comprising:
receiving, from the UE, a capability indication that provides a capability of the UE to detect alternative reference signal sequences in one or more search space occasions.

20. The method of claim 19, wherein the capability indication includes one or more of a capability to detect alternative demodulation reference signal (DMRS) sequences, a capability to receive wideband or narrowband DMRSs, a number of different DMRS sequences that can be concurrently monitored by the UE, a timing adjustment associated with DMRS sequence detection, or any combinations thereof.

21. The method of claim 13, further comprising:
configuring one or more timing adjustments at the UE for decoding the control channel communication or an associated shared channel communication based at least in part on the set of parameters for the two or more reference signal sequences.

22. An apparatus for wireless communication at a user equipment (UE), comprising:
a processor;
memory coupled with the processor; and
instructions stored in the memory and executable by the processor to cause the apparatus to:
receive, from a base station, control information that indicates a set of parameters for two or more reference signal sequences associated with a search space occasion for a control channel communication from the base station, each reference signal sequence associated with a different subset of two or more subsets of control channel candidate locations within the search space occasion, and wherein the control channel communication is transmitted in one of the control channel candidate locations;
determine the two or more reference signal sequences based at least in part on the set of parameters provided with the control information, wherein the set of parameters include one or more time domain parameters associated with the search space occasion, one or more network identification parameters associated with the search space occasion, or one or more sequence shifting or scrambling patterns that provide two or more alternative sequences that correspond to the two or more reference signal sequences;
detect a first reference signal sequence of the two or more reference signal sequences in a reference signal transmission in the search space occasion; and
identify, based at least in part on the detecting the first reference signal sequence, a first subset of the two or more subsets of control channel candidate locations for a blind decoding procedure associated with the control channel communication.

23. The apparatus of claim 22, wherein the first reference signal sequence indicates that the control channel communication is present in the first subset of the control channel candidate locations, and a second reference signal sequence of the two or more reference signal sequences indicates an absence of the control channel communication in the first subset of control channel candidate locations.

24. The apparatus of claim 22, wherein the first subset of the two or more subsets of control channel candidate locations include fewer than all available control channel candidate locations in the search space occasion, and a second subset of the two or more subsets of control channel candidate locations includes one or more control channel candidate locations that are different than the first subset of control channel candidate locations.

25. The apparatus of claim 22, wherein the instructions are further executable by the processor to cause the apparatus to:
perform the blind decoding procedure on a first control channel candidate location of the first subset of the two or more subsets of control channel candidate locations; and
perform the blind decoding procedure on at least a second control channel candidate location of the first subset of the two or more subsets of control channel candidate locations based on an unsuccessful blind decoding on the first control channel candidate location.

26. An apparatus for wireless communication at a base station, comprising:
a processor;
memory coupled with the processor; and
instructions stored in the memory and executable by the processor to cause the apparatus to:
transmit, to a user equipment (UE), control information that indicates a set of parameters for two or more reference signal sequences associated with a search space occasion for a control channel communication from the base station, each reference signal sequence of the two or more reference signal sequences associated with a different subset of two or more subsets of control channel candidate locations within the search space occasion, and wherein the control channel communication is transmitted in one of the control channel candidate locations;

determine the two or more reference signal sequences based at least in part on the set of parameters provided with the control information, wherein the set of parameters include one or more time domain parameters associated with the search space occasion, one or more network identification parameters associated with the search space occasion, or one or more sequence shifting or scrambling patterns that provide two or more alternative sequences that correspond to the two or more reference signal sequences;

select a first control channel candidate location for the control channel communication;

determine a first reference signal sequence of the two or more reference signal sequences in the search space occasion based at least in part on the first control channel candidate location being in a first subset of the two or more subsets of control channel candidate locations; and transmit a reference signal using the first reference signal sequence and the control channel communication in the first control channel candidate location.

27. The apparatus of claim 26, wherein the first reference signal sequence indicates that the control channel communication is present in the first subset of control channel candidate locations, and a second reference signal sequence of the two or more reference signal sequences indicates an absence of the control channel communication in the first subset of control channel candidate locations.

28. The apparatus of claim 26, wherein the first subset of the two or more subsets of control channel candidate locations include fewer than all available control channel candidate locations in the search space occasion, and a second subset of the two or more subsets of control channel candidate locations includes one or more control channel candidate locations that are different than the first subset of control channel candidate locations.

* * * * *